United States Patent
Nagahara

(10) Patent No.: US 9,383,560 B2
(45) Date of Patent: Jul. 5, 2016

(54) ZOOM LENS FOR PROJECTION AND PROJECTION-TYPE DISPLAY APPARATUS

(71) Applicant: FUJIFILM Corporation, Tokyo (JP)

(72) Inventor: Akiko Nagahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/484,552

(22) Filed: Sep. 12, 2014

(65) Prior Publication Data

US 2014/0376101 A1  Dec. 25, 2014

Related U.S. Application Data

(63) Continuation of application No. PCT/JP2013/001106, filed on Feb. 26, 2013.

(30) Foreign Application Priority Data

Mar. 13, 2012 (JP) ................ 2012-055686

(51) Int. Cl.

| | |
|---|---|
| *G02B 13/16* | (2006.01) |
| *G02B 15/14* | (2006.01) |
| *G02B 15/177* | (2006.01) |
| *G02B 13/22* | (2006.01) |
| *G02B 13/18* | (2006.01) |
| *G03B 21/00* | (2006.01) |

(52) U.S. Cl.
CPC .............. *G02B 15/177* (2013.01); *G02B 13/16* (2013.01); *G02B 13/18* (2013.01); *G02B 13/22* (2013.01); *G03B 21/005* (2013.01)

(58) Field of Classification Search
CPC ........ G02B 13/16; G02B 15/14; G02B 15/16; G02B 15/20

USPC ................... 359/649–651, 676, 683
See application file for complete search history.

(56) References Cited

U.S. PATENT DOCUMENTS

| | | | |
|---|---|---|---|
| 7,151,636 | B2 | 12/2006 | Yasui |
| 8,179,606 | B2 | 5/2012 | Amano |
| 8,270,092 | B2 | 9/2012 | Nagatoshi et al. |
| 8,373,933 | B2 | 2/2013 | Eguchi |
| 8,493,663 | B2 | 7/2013 | Maeda |
| 2005/0243436 | A1 | 11/2005 | Yasui |

(Continued)

FOREIGN PATENT DOCUMENTS

| | | |
|---|---|---|
| JP | 2005-316186 | 11/2005 |
| JP | 2008-275713 | 11/2008 |

(Continued)

OTHER PUBLICATIONS

International Search Report dated May 7, 2013 in corresponding International Application No. PCT/JP2013/001106.

*Primary Examiner* — William Choi

(74) *Attorney, Agent, or Firm* — Young & Thompson

(57) ABSTRACT

A zoom lens for projection substantially consists of a negative first lens group, a positive second lens group, a positive third lens group, a negative fourth lens group, a positive fifth lens group, and a positive sixth lens in this order from a magnification side. The first lens group and the sixth lens group are fixed and the second lens group through the fifth lens group move during magnification change. A reduction side is telecentric. First through fourth lenses from the magnification side in the fifth lens group are a negative meniscus-shaped single lens with its convex surface facing the magnification side, a positive single lens, a biconcave lens and a biconvex lens, respectively, and the biconcave lens and the biconvex lens are cemented together.

20 Claims, 11 Drawing Sheets

(56) References Cited

U.S. PATENT DOCUMENTS

| | | |
|---|---|---|
| 2010/0165476 A1 | 7/2010 | Eguchi |
| 2011/0038054 A1 | 2/2011 | Maeda |
| 2011/0109975 A1 | 5/2011 | Amano |
| 2011/0157716 A1 | 6/2011 | Nagatoshi et al. |
| 2013/0293971 A1 | 11/2013 | Maeda |

FOREIGN PATENT DOCUMENTS

| | | |
|---|---|---|
| JP | 2010-122326 | 6/2010 |
| JP | 2010-156762 | 7/2010 |
| JP | 2010-271558 | 12/2010 |
| JP | 2011-013657 | 1/2011 |
| JP | 2011-65138 | 3/2011 |
| JP | 2011-100079 | 5/2011 |
| JP | 2011-154339 | 8/2011 |

ZOOM LENS FOR PROJECTION AND PROJECTION-TYPE DISPLAY APPARATUS

CROSS-REFERENCE TO RELATED APPLICATIONS

This application is a Continuation of PCT International Application No. PCT/JP2013/001106 filed on Feb. 26, 2013, which claims priority under 35 U.S.C. §119(a) to Japanese Patent Application No. 2012-055686 filed on Mar. 13, 2012. Each of the above applications is hereby expressly incorporated by reference, in its entirety, into the present application.

BACKGROUND OF THE INVENTION

1. Field of the Invention

The present invention relates to a zoom lens for projection and a projection-type display apparatus. For example, the present invention relates to a zoom lens for projection appropriate to magnify and project rays carrying video image information from a light valve onto a screen, and also to a projection-type display apparatus using the zoom lens for projection.

2. Description of the Related Art

Conventionally, projection-type display apparatuses for magnifying and projecting images displayed on light valves, such as a liquid crystal display device and a DMD (Digital Micromirror Device: Registered Trademark), were used during presentation and the like. It is desirable, for example, that a lens for projection mounted on such an apparatus has a long back focus so that a color combination optical system is arrangeable between the light valve and the projection lens. Further, when the angle dependency characteristics of the color combination optical system are taken into consideration, it is desirable that a reduction side is telecentric. When the installation characteristics for indoor space setting are taken into consideration, it is desirable that the structure is compact, and the like.

Further, in recent years, zoom lenses that can change the sizes of images on a screen were often used. Therefore, a zoom lens that can change the size at a high ratio, in other words, a zoom lens with a high zoom ratio is requested. Further, since a widening function for making a large image projectable onto a position close to the projection-type display apparatus is needed, a wider angle of view is also requested. The lens system also needs to have a small F-number, which means the lens system is a fast lens system, to realize a projection-type display apparatus with higher brightness. Further, aberrations also need to be excellently corrected to cope with recent high definition light valves.

To satisfy the aforementioned needs and requests, five-group or six-group zoom lenses for projection have been proposed. As known six-group zoom lenses for projection, zoom lenses are disclosed, for example, in Japanese Unexamined Patent Publication No. 2005-316186 (Patent Document 1), Japanese Unexamined Patent Publication No. 2008-275713 (Patent Document 2), Japanese Unexamined Patent Publication No. 2011-100079 (Patent Document 3), and Japanese Unexamined Patent Publication No. 2010-156762 (Patent Document 4). In the six-group zoom lenses, a first lens group having negative refractive power, and which is fixed during magnification change, is arranged closest to the magnification side, and a sixth lens group having positive refractive power, and which is fixed during magnification change, is arranged closest to the reduction side. Further, four lens groups of second through fifth lens groups that move during magnification change are arranged between the first lens group and the sixth lens group. Further, Japanese Unexamined Patent Publication No. 2011-154339 (Patent Document 5) discloses a five-group zoom lens for projection in which a first lens group having negative refractive power, and which is fixed during magnification change, is arranged closest to the magnification side and a fifth lens group having positive refractive power, and which is fixed during magnification change, is arranged closest to the reduction side. Further, three lens groups of second through fourth lens groups that move during magnification change are arranged between the first lens group and the fifth lens group.

SUMMARY OF THE INVENTION

In recent years, as competition in development became severe, it became desirable that a zoom lens for projection satisfies plural high-level requests at the same time. Specifically, a zoom lens with higher performance, a smaller F-number, a wider angle of view and a higher zoom ratio, and which is applicable to a wider range of use, while the size of the zoom lens is suppressed is requested.

However, in the six-group zoom lens disclosed in Patent Document 1, an angle of view and a zoom ratio are insufficient. In the zoom lens disclosed in Patent Document 2, an angle of view is small. In the zoom lens disclosed in Patent Document 3, an F-number is large. In the six-group zoom lens disclosed in Patent Document 4, an F-number is rather large. Further, the zoom lens disclosed in Patent Document 5 is requested to satisfy a smaller F-number and a wider angle of view at the same time in some cases.

In view of the foregoing circumstances, it is an object of the present invention to provide a zoom lens for projection, the reduction side of which is telecentric, and which achieves a small F-number, a wide angle of view, a high zoom ratio and excellent optical performance at the same time while suppressing an increase in the size of the optical system, and also a projection-type display apparatus including such a zoom lens for projection.

A zoom lens for projection according to the present invention substantially consists of six lens groups of a first lens group having negative refractive power, a second lens group having positive refractive power, a third lens group having positive refractive power, a fourth lens group having negative refractive power, a fifth lens group having positive refractive power, and a sixth lens group having positive refractive power in this order from a magnification side. The zoom lens is configured in such a manner that the first lens group and the sixth lens group are fixed and the second through fifth lens groups move during magnification change, and a reduction side is telecentric. Further, first through fourth lenses from the magnification side in the fifth lens group are a negative meniscus-shaped single lens with its convex surface facing the magnification side, a positive single lens, a biconcave lens and a biconvex lens, respectively, and the biconcave lens and the biconvex lens are cemented together.

In the zoom lens for projection according to the present invention, it is desirable that the following conditional formula (1) is satisfied:

$$2.5 < (R51a + R51b)/(R51a - R51b) < 7.0 \qquad (1),$$

where

R51a: a curvature radius of a magnification-side surface of a most-magnification-side lens in the fifth lens group, and R51b: a curvature radius of a reduction-side surface of the most-magnification-side lens in the fifth lens group.

In the zoom lens for projection according to the present invention, it is desirable that the following conditional formulas (2) through (4) are satisfied:

$$vd51 < 35.0 \quad (2);$$

$$1.72 < Nd52 \quad (3);$$

and $$vd52 < 60.0 \quad (4),$$

where vd51: an Abbe number of the most-magnification-side lens in the fifth lens group for d-line, Nd52: a refractive index of the second lens from the magnification side in the fifth lens group for d-line, and vd52: an Abbe number of the second lens from the magnification side in the fifth lens group for d-line.

In the zoom lens for projection according to the present invention, it is desirable that the following conditional formula (5) is satisfied:

$$0.10 < R51b/R52a < 0.70 \quad (5),$$

where

R51b: a curvature radius of a reduction-side surface of the most-magnification-side lens in the fifth lens group, and R52a: a curvature radius of a magnification-side surface of the second lens from the magnification side in the fifth lens group.

It is desirable that the zoom lens for projection according to the present invention is configured in such a manner that the fourth lens groups moves toward a reduction side when magnification is changed from a wide angle end to a telephoto end.

In the zoom lens for projection according to the present invention, it is desirable that the following conditional formulas (6) and (7) are satisfied:

$$(|fF56w|-dG45w)/fw < 0.0 \quad (6);$$

and $$0.0 < (|fF56t|-dG45t)/fw \quad (7),$$

where fw: a focal length of an entire system at a wide angle end, fF56w: a combined front focus of the fifth lens group and the sixth lens group at the wide angle end, fF56t: a combined front focus of the fifth lens group and the sixth lens group at a telephoto end, dG45w: a distance on an optical axis between the fourth lens group and the fifth lens group at the wide angle end, and dG45t: a distance on the optical axis between the fourth lens group and the fifth lens group at the telephoto end.

It is desirable that the zoom lens for projection according to the present invention is configured in such a manner that the second lens group and the fifth lens group move toward the magnification side when magnification is changed from a wide angle end to a telephoto end.

In the zoom lens for projection according to the present invention, the fourth lens group may substantially consist of a negative lens.

In the zoom lens for projection according to the present invention, it is desirable that the following conditional formula (8) is satisfied:

$$-6.0 < f4/fw < -2.0 \quad (8),$$

where f4: a focal length of the fourth lens group, and fw: a focal length of an entire system at a wide angle end.

In the zoom lens for projection according to the present invention, it is desirable that a most-magnification-side lens in the first lens group has at least one aspherical surface.

In the zoom lens for projection according to the present invention, the third lens group may substantially consist of a cemented lens composed of a positive lens and a negative lens cemented together in this order from the magnification side.

In the zoom lens for projection according to the present invention, it is desirable that the following conditional formula (9) is satisfied:

$$4.0 < f3/fw < 12.0 \quad (9),$$

where f3: a focal length of the third lens group, and fw: a focal length of an entire system at a wide angle end.

In the zoom lens for projection according to the present invention, it is desirable that the following conditional formula (10) is satisfied:

$$2.0 < f5/fw < 6.0 \quad (10),$$

where f5: a focal length of the fifth lens group, and fw: a focal length of an entire system at a wide angle end.

In the zoom lens for projection according to the present invention, it is desirable that the following conditional formula (11) is satisfied:

$$Fnw \leq 1.8 \quad (11),$$

where

Fnw: an F-number at a wide angle end.

In the zoom lens for projection according to the present invention, it is desirable that the following conditional formula (12) is satisfied:

$$60° \leq 2\omega w \quad (12),$$

where

2ωw: a maximum full angle of view at a wide angle end.

In the zoom lens for projection according to the present invention, it is desirable that the following conditional formula (13) is satisfied:

$$1.4 \leq Zr \quad (13),$$

where

Zr: a zoom ratio.

A projection-type display apparatus according to the present invention includes alight source, a light valve on which light from the light source is incident, and the aforementioned zoom lens for projection of the present invention, as a zoom lens for projection that projects an optical image of light that has been optically modulated by the light valve onto a screen.

Here, the term "magnification side" means a projected side (a screen side). The screen side will be referred to as the magnification side also in reduction projection for the sake of convenience. On the other hand, the term "reduction side" means an original image display area side (a light valve side). The light valve side will be referred to as the reduction side also in reduction projection for the sake of convenience.

Here, the expression "substantially consists of six lens groups" means that lenses and lens groups substantially without any refractive power, optical elements other than lenses, such as a stop and a cover glass, and the like may be included in addition to the lens groups mentioned as composition elements. Further, the expressions "substantially consist(s) of" and "substantially consisting of" in the other part of the specification and the claims of the present application are used in similar meanings.

The "lens group" does not necessarily consist of plural lenses. The lens group may consist of only one lens.

The "single lens" means a lens consisting of one lens, which is not a cemented lens.

The surface shape of a lens and the sign of the refractive power of a lens are considered in a paraxial region when the lens includes an aspherical surface.

The sign of a curvature radius is positive when a surface shape is convex toward the object side, and negative when a surface shape is convex toward the image side.

Regarding the terms "back focus" and "front focus", the magnification side and the reduction side are regarded as sides corresponding to the object side and the image side of a general imaging lens, respectively, and the magnification side and the reduction side are regarded as the front side and the back side, respectively.

In the zoom lens for projection according to the present invention, the negative first lens group, which is fixed during magnification change, is arranged closet to the magnification side, and the positive sixth lens group, which is fixed during magnification change, is arranged closest to the reduction side. Further, four lens groups of a positive lens group, a positive lens group, a negative lens group and a positive lens group, which move during magnification change, are arranged in this order from the magnification side between the first lens group and the sixth lens group. Further, a reduction side is telecentric, and the structure of the first through fourth lenses from the magnification side in the fifth lens group are set in detail. Therefore, a small F-number, a wide angle of view, a high zoom ratio and excellent optical performance are achievable at the same time while an increase in the size of the optical system is suppressed.

The projection-type display apparatus according to the present invention includes the zoom lens for projection of the present invention. Therefore, it is possible to suppress an increase in the size of the apparatus. Further, the projection-type display apparatus has a high zoom ratio and a wide angle of view, and can possess excellent projection performance.

DESCRIPTION OF THE PREFERRED EMBODIMENTS

Hereinafter, embodiments of the present invention will be described in detail with reference to drawings. FIG. 1 through FIG. 5 are cross sections illustrating examples of the structure of the zoom lenses for projection according to embodiments of the present invention. FIG. 1 through FIG. 5 correspond to the zoom lenses for projection in Examples 1 through 5, respectively, which will be described later. The basic structure of the examples illustrated in FIG. 1 through FIG. 5 is similar to each other, and the illustration method of FIG. 1 through FIG. 5 is also similar. Therefore, the zoom lens for projection according to the embodiments of the present invention will be described mainly with reference to FIG. 1.

Figure 1:
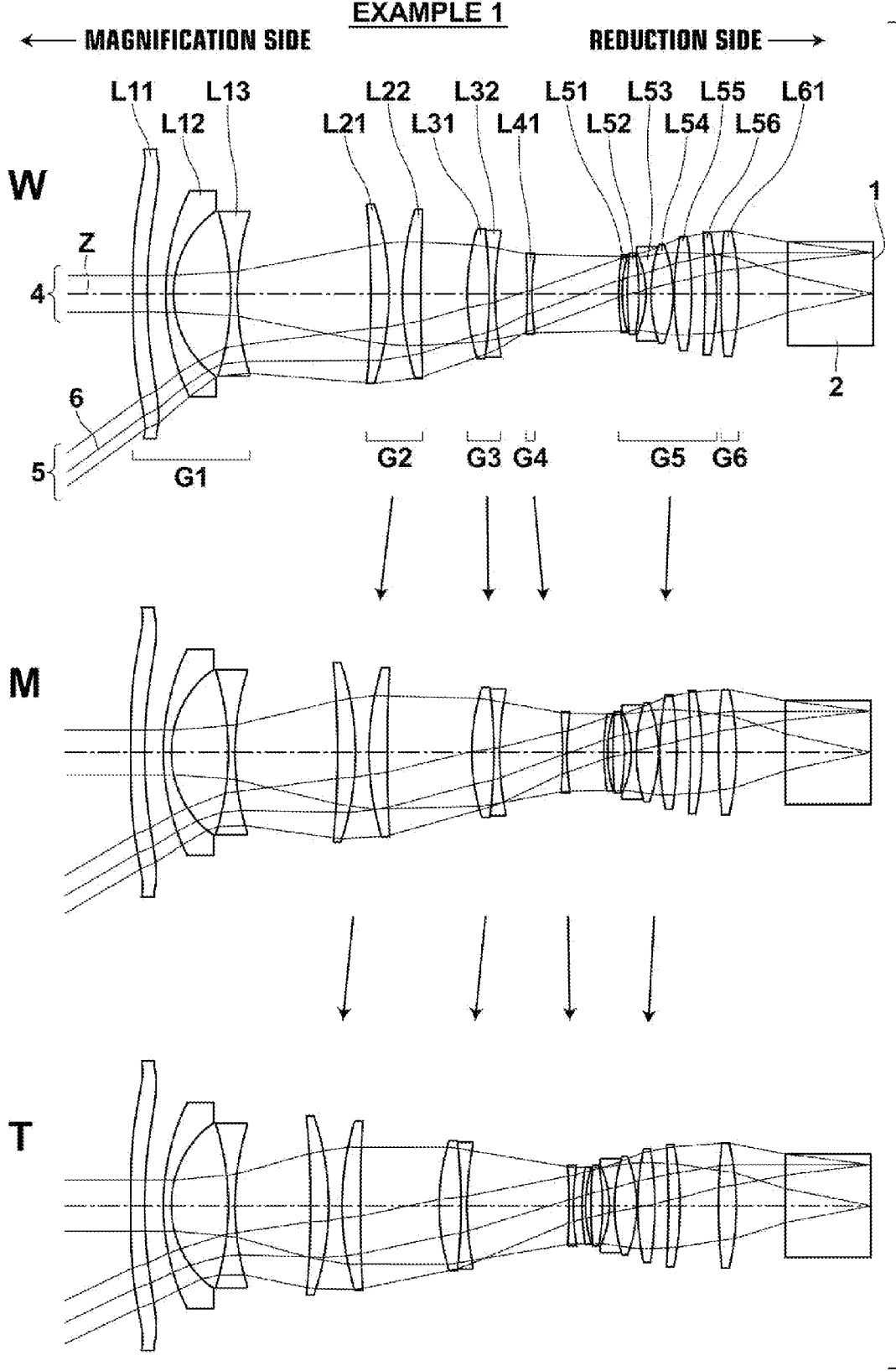
FIG. 1 is a cross section illustrating the lens structure of a zoom lens for projection in Example 1 of the present invention and paths of rays.

FIG. 1 is a cross section illustrating the lens structure of the zoom lens for projection according to an embodiment of the present invention. A top row, a middle row and a bottom row indicated by the signs of W, M and T on the left side of FIG. 1 illustrate the arrangement and structure of each lens group at a wide angle end, in a middle focal length state, and at a telephoto end, respectively. In FIG. 1, axial rays 4 and off-axial rays 5 at a maximum angle of view are also illustrated.

This zoom lens for projection is mounted, for example, on a projection-type display apparatus, and usable as a projection lens for projecting image information displayed on a light valve onto a screen. In FIG. 1, the left side of the diagram is the magnification side, and the right side of the diagram is the reduction side. Assuming a case of mounting the zoom lens for projection on a projection-type display apparatus, FIG. 1 illustrates also a glass block 2, which is assumed to be a filter, a prism and the like used in a color combination unit or a illumination light separation unit, and an image display surface 1 of the light valve located on the reduction-side surface of the glass block 2.

In the projection-type display apparatus, rays to which image information has been given at the image display surface 1 enter the zoom lens for projection through the glass block 2. Further, the rays are projected, by the zoom lens for projection, onto a screen (not illustrated) arranged in the left-side direction of the paper surface.

FIG. 1 illustrates an example in which the position of the reduction-side surface of the glass block 2 and the position of the image display surface 1 are matched with each other. However, the present invention is not necessarily limited to this example. Further, FIG. 1 illustrates only one image display surface 1. The projection-type display apparatus may be structured so that a full color image is displayable by separating rays from a light source into three primary colors by a color separation optical system, and by providing three light valves for the respective primary colors.

The zoom lens for projection according to an embodiment of the present invention substantially consists of six lens groups of first lens group G1 having negative refractive power, second lens group G2 having positive refractive power, third lens group G3 having positive refractive power, fourth lens group G4 having negative refractive power, fifth lens group G5 having positive refractive power, and sixth lens group G6 having positive refractive power in this order from a magnification side. Further, the zoom lens is configured in such a manner that a reduction side is telecentric.

The expression "a reduction side is telecentric" represents a state in which a bisector of an angle between the maximum ray on the upper side and the maximum ray on the lower side in a cross section of rays converging at an arbitrary point on a reduction-side image plane is nearly parallel to an optical axis. The expression does not mean only a perfect telecentric case, i.e., a case in which the bisector of the angle is perfectly parallel to the optical axis. The expression also means a case with some error. Here, the case with some error means that the inclination of the bisector of the angle with respect to the optical axis is within the range of ±3°. In FIG. 1, the bisector of the angle about the off-axial rays 5 at the maximum angle of view is illustrated as a virtual chief ray 6.

The negative-lead-type structure in which the most-magnification-side lens group in the entire system is a negative lens group and the most-reduction-side lens group in the entire system is a positive lens group is advantageous to widening an angle of view, compared with positive-lead-type structure. The negative-lead-type structure can easily secure a back focus having a necessary length to insert a prism or the like.

First lens group G1 and sixth lens group G6 are fixed and second lens group G2, third lens group G3, fourth lens group G4 and fifth lens group G5 move during magnification change. In FIG. 1, the directions of movement of the lens groups that move when magnification is changed from a wide angle end to a middle focal length state and when magnification is changed from the middle focal length state to a telephoto end are schematically indicated by arrows illustrated between the positions.

The zoom lens for projection according to the embodiment of the present invention is structured to have a zoom function by moving four lens groups of second lens group G2 through fifth lens group G5 during magnification change. In other words, the variable magnification function is shared by the four lens groups. Therefore, it is possible to satisfy requests for smaller size, higher performance, a higher zoom ratio and a small F-number at the same time. When the number of lens groups that move during magnification is three or less, it is not easy to satisfy these requests at the same time.

When the refractive power of the four moving lens groups, which move during magnification change, is positive refractive power, positive refractive power, negative refractive power and positive refractive power in this order from the magnification side, a wider angle of view and a small F-number are achievable at the same time while suppressing an excessive increase in the diameters of first lens group G1 and second lens group G2, which tend to become large.

When magnification is changed from a wide angle end to a telephoto end, it is desirable that second lens group G2 and fifth lens group G5 move toward the magnification side. That is advantageous to reduction in size. Further, when magnification is changed from a wide angle end to a telephoto end, it is desirable that fourth lens group G4 moves toward the reduction side. That is advantageous to achieving a wider angle of view and a small F-number at the same time.

As the structure of each lens group in the example illustrated in FIG. 1, first lens group G1 consists of three lenses L11 through L13, and second lens group G2 consists of two lenses L21, L22. Third lens group G3 consists of two lenses L31, L32, and fourth lens group G4 consists of one lens of lens L41. Fifth lens group G5 consists of six lenses L51 through L56, and sixth lens group G6 consists of one lens of lens L61. First lens group G1 in the zoom lens for projection of the present invention may consist of four lenses, as in the examples illustrated in FIG. 3 through FIG. 5. Further, the number of a lens or lenses in each lens group of the zoom lens for projection according to the present invention is not necessarily limited to the examples illustrated in FIG. 1 through FIG. 5.

The zoom lens for projection of the present invention has characteristic features in the structure of lenses L51 through L54, which are the first through fourth lenses from the magnification side in fifth lens group G5. As illustrated in FIG. 1, lens L51 is a negative meniscus-shaped single lens with its convex surface facing the magnification side, and lens L52 is a positive single lens. lens L53 is a biconcave lens, and lens L54 is a biconvex lens. Lens L53 and lens L54 are cemented together, and constitute a cemented lens.

When the four lenses from the magnification side in fifth lens group G5 are structured as described above, it is possible to excellently correct curvature of field and a longitudinal chromatic aberration in the whole zoom range while achieving a small F-number. Especially, when both of lenses L51, L52 are single lenses, which are not cemented together, an air space is formed between them. That is advantageous to correction of curvature of field. It is desirable that the magnification side surface of lens L52 is a convex surface, and that a thin air lens is formed between lens L51 and lens L52 to more excellently correct curvature of field.

It is desirable that the other lens groups are structured as will be described next. It is desirable that lens L11, which is arranged closest to the magnification side in first lens group G1, has at least one aspherical surface. When lens L11 is an aspherical lens, it is possible to excellently correct distortion while suppressing the number of a lens or lenses. Since the diameter of lens L11 is the largest in the entire system, it is desirable that lens L11 is a plastic lens. In that case, lens L11 is structurable at low cost and in light weight.

It is desirable that third lens group G3 consists of a set of cemented lens composed of a positive lens and a negative lens cemented together in this order from the magnification side. When third lens group G3 is structured in this manner, it is possible to excellently correct a longitudinal chromatic aberration in the whole zoom range while suppressing the total length of the lens system.

It is desirable that fourth lens group G4 consists of a negative lens. In such a case, it is possible to effectively secure a space for movement of the moving groups in the limited length of the lens system.

It is desirable that sixth lens group G6 consists of one positive lens, and that is advantageous to reduction in size.

It is desirable that the zoom lens for projection according to an embodiment of the present invention satisfies the following conditional formula (1):

$$2.5 < (R51a + R51b)/(R51a - R51b) < 7.0 \quad (1),$$

where

R51a: a curvature radius of a magnification-side surface of a most-magnification-side lens in the fifth lens group, and R51b: a curvature radius of a reduction-side surface of the most-magnification-side lens in the fifth lens group.

If the value is lower than or equal to the lower limit of conditional formula (1), power balance within fifth lens group G5 is lost, and it becomes difficult to excellently correct curvature of field while securing a small F-number. If the value is higher than or equal to the upper limit of conditional formula (1), the curvature radius of the magnification-side surface of lens L51 and the curvature radius of the reduction-side surface of lens L51 become close to each other, and processing characteristics deteriorate. When conditional formula (1) is satisfied, it is possible to realize a lens system in which curvature of field has been excellently corrected while a small F-number is secured.

Therefore, it is more desirable that the following conditional formula (1') is satisfied to more excellently correct curvature of field, and to improve processing characteristics:

$$3.0 < (R51a + R51b)/(R51a - R51b) < 5.5 \quad (1').$$

It is desirable that the zoom lens for projection according to an embodiment of the present invention satisfies the following conditional formulas (2) through (4). When conditional formulas (2), (3) and (4) are satisfied at the same time, it is possible to excellently suppress a fluctuation of a longitudinal chromatic aberration for the whole zoom range:

$$vd51 < 35.0 \quad (2);$$

$$1.72 < Nd52 \quad (3);$$

and $$vd52 < 60.0 \quad (4),$$

where
vd51: an Abbe number of the most-magnification-side lens in the fifth lens group for d-line,
Nd52: a refractive index of the second lens from the magnification side in the fifth lens group for d-line, and
vd52: an Abbe number of the second lens from the magnification side in the fifth lens group for d-line.

In addition to conditional formulas (2), (3) and (4), it is more desirable that at least one of the following conditional formulas (2'), (3') and (4') is satisfied:

$$23.0 < vd51 < 30.0 \quad (2');$$

$$1.75 < Nd52 < 1.80 \quad (3');$$

and $$35.0 < vd52 < 55.0 \quad (4').$$

When each of the upper limit of conditional formula (2'), the lower limit of conditional formula (3') and the upper limit or the lower limit of conditional formula (4') is satisfied, it is possible to more excellently suppress a fluctuation of a longitudinal chromatic aberration for the whole zoom range. A general material, which does not satisfy the lower limit of conditional formula (2') and the upper limit of conditional formula (3'), has a low internal transmittance. Therefore, transmittance of the lens system becomes lower.

It is desirable that the zoom lens for projection according to an embodiment of the present invention satisfies the following conditional formula (5). When conditional formula (5) is satisfied, an air lens formed by the reduction-side surface of lens L51 and the magnification-side surface of lens L52 has a meniscus shape with its convex surface facing the magnification side. When conditional formula (5) is satisfied, it is possible to excellently correct curvature of field, while achieving a small F-number:

$$0.10 < R51b/R52a < 0.70 \quad (5),$$

where
R51b: a curvature radius of a reduction-side surface of the most-magnification-side lens in the fifth lens group, and
R52a: a curvature radius of a magnification-side surface of the second lens from the magnification side in the fifth lens group.

Therefore, it is more desirable that the following conditional formula (5') is satisfied to more excellently correct curvature of field:

$$0.25 < R51b/R52a < 0.50 \quad (5').$$

It is desirable that the zoom lens for projection according to an embodiment of the present invention satisfies the following conditional formulas (6) and (7):

$$(|fF56w| - dG45w)/fw < 0.0 \quad (6);$$

and $$0.0 < (|fF56t| - dG45t)/fw \quad (7),$$

where
fw: a focal length of an entire system at a wide angle end,
fF56w: a combined front focus of the fifth lens group and the sixth lens group at the wide angle end,
fF56t: a combined front focus of the fifth lens group and the sixth lens group at a telephoto end,
dG45w: a distance on an optical axis between the fourth lens group and the fifth lens group at the wide angle end, and
dG45t: a distance on the optical axis between the fourth lens group and the fifth lens group at the telephoto end.

When an intersection of the aforementioned virtual chief ray 6 and optical axis Z is regarded as a position of a virtual stop, conditional formulas (6) and (7) define a positional relationship between the position of the virtual stop and fourth lens group G4 in the zoom lens for projection of the present invention, the reduction side of which is telecentric.

When conditional formula (6) is satisfied, fourth lens group G4 is located to the magnification side of the position of the virtual stop at a wide angle end. Therefore, when the virtual chief ray 6 traveling from the image display surface 1 toward the magnification side is considered, the virtual chief ray 6 enters fourth lens group G4 after crossing optical axis Z, and is refracted by fourth lens group G4, which has negative refractive power, toward a direction away from optical axis Z. Therefore, it is possible to further widen the angle of view of the lens system.

Meanwhile, when conditional formula (7) is satisfied, fourth lens group G4 is located to the reduction side of the position of the virtual stop at a telephoto end. At this time, a distance between third lens group G3 and fourth lens group G4 is long, as illustrated in the bottom row of FIG. 1, which is the diagram illustrating structure at the telephoto end. When the axial rays 4 traveling from the image display surface 1 toward the magnification side are considered, the axial rays 4 can travel a long distance between third lens group G3 and fourth lens group G4 while the diameter of the axial rays 4 is increased by a dispersion action of fourth lens group G4, which has negative refractive power. Therefore, it is possible to finally output rays having a large diameter from first lens group G1, and to further increase the zoom ratio.

When both of conditional formulas (6) and (7) are satisfied at the same time, it is possible to achieve both of a wider angle of view and a higher zoom ratio. Further, it is more desirable that at least one of the following conditional formulas (6') and (7') is satisfied:

$$-1.2<(|fF56w|-dG45w|)/fw<0.0 \quad (6');$$

and $$0.0<(|fF56t|-dG45t|)/fw<1.0 \quad (7').$$

If the value is lower than or equal to the lower limit of conditional formula (6'), the total length of the lens system becomes too long, and the lens diameter of second lens group G2 and the lens diameter of third lens group G3 become large. If the value is higher than or equal to the upper limit of conditional formula (7'), the lens diameter of second lens group G2 and the lens diameter of third lens group G3 become large.

It is desirable that the zoom lens for projection according to an embodiment of the present invention satisfies the following conditional formula (8):

$$-6.0<f4/fw<-2.0 \quad (8),$$

where f4: a focal length of the fourth lens group, and fw: a focal length of an entire system at a wide angle end.

If the value is lower than or equal to the lower limit of conditional formula (8), the negative refractive power of fourth lens group G4 becomes weak. Therefore, the positive refractive power of third lens group G3 and fifth lens group G5 also becomes weak, and the total length becomes too long, or distances between lens groups of third lens group G3 through fifth lens group G5 become long, and the total length becomes too long. If the value is higher than or equal to the upper limit of conditional formula (8), the lens diameter of second lens group G2 and the lens diameter of third lens group G3 become large.

Therefore, it is more desirable that the following conditional formula (8') is satisfied to suppress the total length of the lens system and the lens diameter of second lens group G2 and the lens diameter of third lens group G3:

$$-5.0<f4/fw<-3.0 \quad (8').$$

It is desirable that the zoom lens for projection according to an embodiment of the present invention satisfies the following conditional formula (9):

$$4.0<f3/fw<12.0 \quad (9),$$

where f3: a focal length of the third lens group, and fw: a focal length of an entire system at a wide angle end.

If the value is lower than or equal to the lower limit of conditional formula (9), a fluctuation of the longitudinal chromatic aberration during magnification change becomes large. If the value is higher than or equal to the upper limit of conditional formula (9), the lens diameter of second lens group G2 becomes large, and the refractive power of second lens group G2 becomes strong, and curvature of field and a spherical aberration are worsened.

Therefore, it is more desirable that the following conditional formula (9') is satisfied to further suppress a fluctuation of a longitudinal chromatic aberration during magnification change, an increase in the diameter of the lens or lenses in second lens group G2 and worsening of curvature of field and a spherical aberration:

$$5.5<f3/fw<10.0 \quad (9').$$

It is desirable that the zoom lens for projection according to an embodiment of the present invention satisfies the following conditional formula (10):

$$2.0<f5/fw<6.0 \quad (10),$$

where f5: a focal length of the fifth lens group, and fw: a focal length of an entire system at a wide angle end.

If the value is lower than or equal to the lower limit of conditional formula (10), the refractive power of sixth lens group G6 becomes weak, and the total length of the lens system becomes long. If the value is higher than or equal to the upper limit of conditional formula (10), the refractive power of fifth lens group G5 becomes weak, and a movement amount during magnification change becomes large. That is disadvantageous to reduction in size.

Therefore, it is more desirable that the following conditional formula (10') is satisfied to further suppress the total length of the lens system, and to further reduce the size:

$$3.0<f5/fw<5.5 \quad (10').$$

It is desirable that the zoom lens for projection according to an embodiment of the present invention satisfies the following conditional formula (11). If conditional formula (11) is not satisfied, it is impossible to realize a fast optical system as requested in recent years. It is more desirable to satisfy the following conditional formula (11') to realize a faster optical system:

$$Fnw \leq 1.8 \quad (11);$$

and $$Fnw \leq 1.7 \quad (11'),$$

where

Fnw: an F-number at a wide angle end.

It is desirable that the zoom lens for projection according to an embodiment of the present invention satisfies the following conditional formula (12). If conditional formula (12) is not satisfied, it becomes impossible to cope with a request for using the zoom lens for projection at a wide angle. It is more desirable that the following conditional formula (12') is satisfied to make the zoom lens more appropriate for use at a wide angle:

$$60° \leq 2\omega w \quad (12);$$

and $$65° \leq 2\omega w \quad (12'),$$

where

2ωw: a maximum full angle of view at a wide angle end.

It is desirable that the zoom lens for projection according to an embodiment of the present invention satisfies the following conditional formula (13). If conditional formula (13) is not satisfied, it is impossible to obtain a high zoom ratio, and a range in which the zoom lens for projection is usable is narrowed. Therefore, the general-purpose characteristics deteriorate:

$$1.4 \leq Zr \quad (13),$$

where

Zr: a zoom ratio.

It is more desirable that the following conditional formula (13') is satisfied:

$$1.5 \leq Zr \leq 2.0 \quad (13').$$

When the value is higher than or equal to the lower limit of conditional formula (13'), it is possible to obtain a higher zoom ratio. If the value exceeds the upper limit of conditional formula (13'), the total length of the lens system becomes too long, and it becomes difficult to structure the lens system in small size. When conditional formula (13') is satisfied, it is possible to reduce the size and to achieve high general-purpose characteristics.

It is desirable that the zoom lens for projection according to an embodiment of the present invention satisfies the following conditional formula (14):

$$1.2 < Bf/Im\phi \tag{14},$$

where
Bf: a back focus of an entire system (a distance in air), and
Imφ: a diameter of a maximum effective image circle on the reduction side.

Here, "Imφ" is obtainable, for example, based on the specification of the zoom lens for projection or the specification of an apparatus on which the zoom lens for projection is mounted.

Conditional formula (14) appropriately sets a relationship between a back focus and an image circle. If the value is lower than or equal to the lower limit of conditional formula (14), it becomes difficult to secure an appropriate space for inserting a beam splitter, a glass block as a color combination means, such as a cross-dichroic prism and a TIR prism, and the like on the reduction side of the lens system, while obtaining an image circle in desirable size.

It is more desirable that the following conditional formula (14') is satisfied. If the value is higher than or equal to the upper limit of conditional formula (14'), the total length becomes too long:

$$1.2 < Bf/Im\phi < 2.0 \tag{14'}.$$

It is desirable that the zoom lens for projection according to an embodiment of the present invention satisfies the following conditional formula (15):

$$1.5 < Bf/fw \tag{15},$$

where
Bf: a back focus of an entire system (a distance in air), and
fw: a focal length of the entire system at the wide angle end.

If the value is lower than the lower limit of conditional formula (15), it becomes difficult to secure an appropriate space for inserting a beam splitter, a glass block as a color combination means, such as a cross-dichroic prism and a TIR prism, and the like on the reduction side of the lens system.

It is more desirable that the following conditional formula (15') is satisfied. When the lower limit of conditional formula (15') is satisfied, it is possible to more easily secure a space for inserting a glass block or the like. If the value is higher than or equal to the upper limit of conditional formula (15'), the total length becomes too long:

$$1.7 < Bf/fw < 2.5 \tag{15'}.$$

In the zoom lens for projection, which is an object of the present invention, it is desirable that distortion is suppressed to be about 2% or less in the whole variable magnification range.

Figure 11:
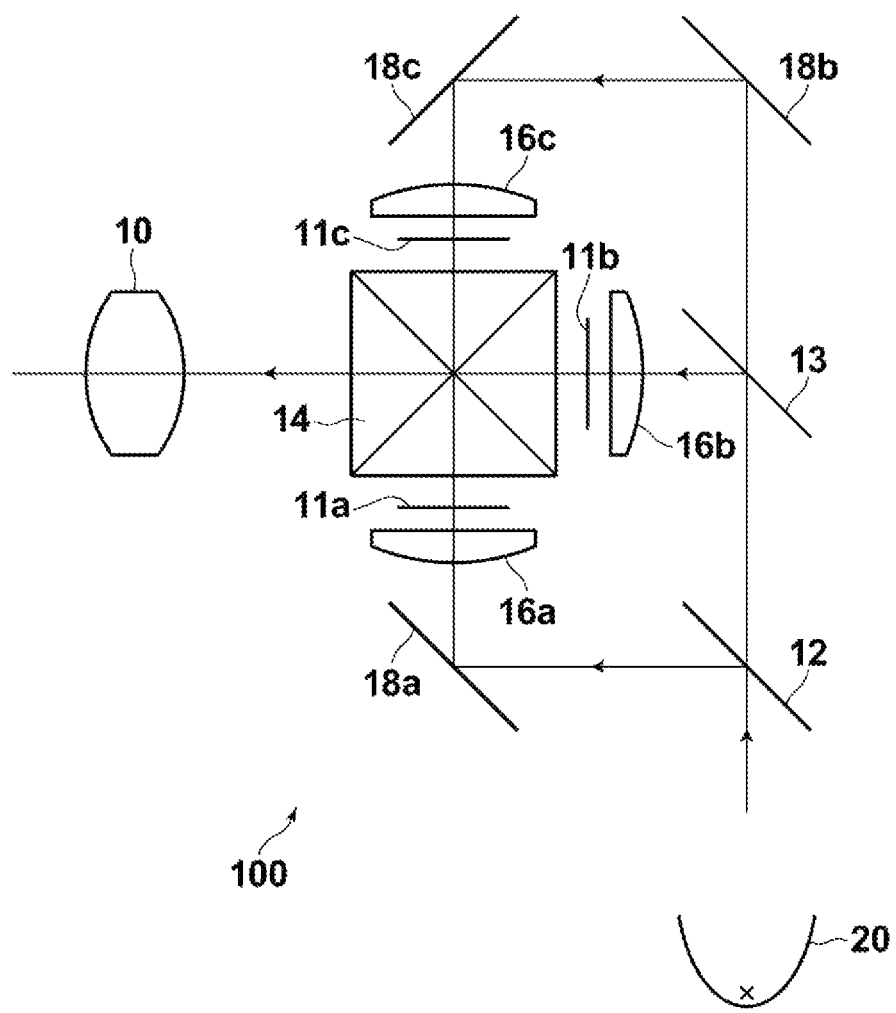
FIG. 11 is a schematic diagram illustrating the configuration of a projection-type display apparatus according to an embodiment of the present invention.

Next, embodiments of a projection-type display apparatus according to the present invention will be described with reference to FIG. 11. FIG. 11 is a schematic diagram illustrating the configuration of a projection-type display apparatus according to an embodiment of the present invention.

A projection-type display apparatus 100 illustrated in FIG. 11 includes a zoom lens 10 for projection according to an embodiment of the present invention, a light source 20, transmission-type display devices 11a through 11c, as light valves corresponding to respective colors, dichroic mirrors 12 and 13 for color separation, a cross-dichroic prism 14 for color combination, condenser lenses 16a through 16c, and total reflection mirrors 18a through 18c for deflecting an optical path. In FIG. 11, the zoom lens 10 for projection is schematically illustrated. An integrator is arranged between the light source 20 and the dichroic mirror 12. However, the integrator is not illustrated in FIG. 11.

White light that has been output from the light source 20 is separated into rays of three colors (G light, B light and R light) by the dichroic mirrors 12 and 13. After then, the rays of respective colors enter transmission-type display devices 11a through 11c corresponding to the rays of respective colors through condenser lenses 16a through 16c, respectively, and are optically modulated. After the colors are combined by the cross-dichroic prism 14, the light enters the zoom lens 10 for projection. The zoom lens 10 for projection projects an optical image of light that has been optically modulated by the transmission-type display devices 11a through 11c onto a screen, which is not illustrated.

As the transmission-type display devices 11a through 11c, for example, transmission-type liquid crystal display devices, and the like may be used. FIG. 11 illustrates an example in which the transmission-type display devices are used as light valves. However, the light valve provided in the projection-type display apparatus of the present invention is not limited to this, and other light modulation means, such as a reflection-type liquid crystal device or a DMD, may be used.

Next, specific examples of the zoom lens for projection will be described.

EXAMPLE 1

FIG. 1 illustrates the lens structure of a zoom lens for projection in Example 1 and paths of rays. Since FIG. 1 has been described already, repetition of explanation will be avoided. FIG. 1 illustrates structure when a projection distance is infinity.

The zoom lens for projection in Example 1 has six group structure, in which first lens group G1 having negative refractive power, second lens group G2 having positive refractive power, third lens group G3 having positive refractive power, fourth lens group G4 having negative refractive power, fifth lens group G5 having positive refractive power and sixth lens group G6 having positive refractive power are arranged in this order from the magnification side. Further, the reduction side is telecentric. A glass block 2, which is assumed to be various kinds of filter, such as an infrared-ray-cut filter and a low-pass filter, a color combination prism and the like is arranged to the reduction side of sixth lens group G6. Further, an image display surface 1 of the light valve is arranged in contact with the reduction-side surface of the glass block 2.

When magnification is changed, first lens group G1 and sixth lens group G6 are fixed, and second lens group G2, third lens group G3, fourth lens group G4 and fifth lens group G5 are movable. The manner of movement of the movable lens groups is indicated by arrows in FIG. 1. The zoom lens is structured in such a manner that second lens group G2 and fifth lens group G5 move toward the magnification side, and fourth lens group G4 moves toward the reduction side when magnification is changed from a wide angle end to a telephoto end.

First lens group G1 consists of lens L11, which is a negative meniscus lens with its convex surface facing the magnification side in a paraxial region, lens L12, which is a negative meniscus lens with its convex surface facing the magnification side, and lens L13, which is a biconcave lens, in this order from the magnification side. Further, both surfaces of lens L11 are aspherical surfaces.

Second lens group G2 consists of lens L21, which is a positive meniscus lens with its convex surface facing the reduction side, and lens L22, which is a positive meniscus lens with its convex surface facing the magnification side, in this order from the magnification side.

Third lens group G3 consists of lens L31, which is a biconvex lens, and L32, which is a biconcave lens, in this order from the magnification side. Lens L31 and lens L32 are cemented together.

Fourth lens group G4 consists of only lens L41, which is a biconcave lens.

Fifth lens group G5 consists of lens L51, which is a negative meniscus lens with its convex surface facing the magnification side, lens L52, which is a biconvex lens, lens L53, which is a biconcave lens, lens L54, which is a biconvex lens, lens L55, which is a biconvex lens, and lens L56, which is a positive meniscus lens with its convex surface facing the reduction side, in this order from the magnification side. Further, lens L53 and lens L54 are cemented together.

Sixth lens group G6 consists of only lens L61, which is a biconvex lens.

Table 1 shows basic lens data on the zoom lens for projection in Example 1. In the basic lens data, column Si shows the surface number of the i-th surface (i=1, 2, 3, . . . ) when the magnification-side surface of the most magnification-side composition element is the first surface, and surface numbers are assigned to surfaces of composition elements to sequentially increase toward the reduction side. Column Ri shows the curvature radius of the i-th surface, and column Di shows a distance between the i-th surface and the (i+1)th surface on optical axis Z. Column Ndj shows the refractive index of the j-th composition element (j=1, 2, 3, . . . ) for d-line (wavelength is 587.6 nm). The most magnification-side composition element is the first composition element, and the number j sequentially increases toward the reduction side. The column vdj shows the Abbe number of the j-th composition element for d-line.

Here, the sign of a curvature radius is positive when a surface shape is convex toward the magnification side, and negative when a surface shape is convex toward the reduction side. The basic lens data show data including the glass block 2. Surfaces with the surface numbers of 1, 2 are aspherical surfaces, and mark * is attached to these surface numbers. The column of curvature radius shows the numerical values of paraxial curvature radii for aspherical surfaces.

A distance between first lens group G1 and second lens group G2, a distance between second lens group G2 and third lens group G3, a distance between third lens group G3 and fourth lens group G4, a distance between fourth lens group G4 and fifth lens group G5, and a distance between fifth lens group G5 and sixth lens group G6 are variable surface distances that change during magnification change. In the column of surface distances, the terms "DD[6]", "DD[10]", "DD[13]", "DD[15]", and "DD[26]" are written in rows corresponding to these variable surface distances, respectively. In other words, when a distance between the i-th surface and the (i+1)th surface is a variable surface distance, the term "DD[Di]" is written.

Table 2 shows specification for d-line and the values of each of the variable surface distances of the zoom lens for projection in Example 1 at a wide angle end, in a middle focal length state, and at a telephoto end. In Table 2, f is the focal length of the entire system, and FNo. is an F-number, and 2ω is a full angle of view (the unit is degrees).

Table 3 shows aspherical surface coefficients of the surfaces with surface numbers of 1 and 2. In the numerical values of the aspherical surface coefficients in Table 3, "E-n" (n: integer) means "×10$^{-n}$". The aspherical surface coefficients are values of coefficients K, Am (m=3, 4, 5, . . . 15) in an aspherical surface equation represented by the following expression:

$$Zd = C \cdot h^2 / \{1 + (1 - K \cdot C^2 \cdot h^2)^{1/2}\} + \Sigma Am \cdot h^m,$$

where

Zd: the depth of an aspherical surface (the length of a perpendicular from a point on the aspherical surface at height h to a flat plane that contacts with the vertex of the aspherical surface and is perpendicular to the optical axis), h: a height (the length from the optical axis to the lens surface), C: a paraxial curvature, and K, Am: aspherical surface coefficients (m=3, 4, 5, . . . 15).

The numerical values shown in Table 1 through Table 3 are normalized values so that the focal length of the entire system at a wide angle end is 1, and values when a projection distance is infinity are shown. Further, numerical values in the tables are rounded at predetermined digits.

TABLE 1

EXAMPLE 1 BASIC LENS DATA

| Si | Ri | Di | Ndj | vdj |
|---|---|---|---|---|
| *1 | 26.9729 | 0.2493 | 1.49100 | 57.58 |
| *2 | 8.5165 | 0.3283 | | |
| 3 | 3.8564 | 0.1402 | 1.49700 | 81.54 |
| 4 | 1.7121 | 1.0055 | | |
| 5 | −4.5488 | 0.1194 | 1.71736 | 29.52 |
| 6 | 4.4317 | DD[6] | | |
| 7 | −15.9523 | 0.3187 | 1.78590 | 44.20 |
| 8 | −4.6473 | 0.2361 | | |
| 9 | 4.7820 | 0.3245 | 1.80400 | 46.57 |
| 10 | 29.2817 | DD[10] | | |
| 11 | 3.5604 | 0.3879 | 1.77250 | 49.60 |
| 12 | −8.9003 | 0.1039 | 1.49700 | 81.54 |
| 13 | 5.1578 | DD[13] | | |
| 14 | −9.8089 | 0.0779 | 1.71300 | 53.87 |
| 15 | 4.2975 | DD[15] | | |
| 16 | 4.0839 | 0.0610 | 1.80518 | 25.42 |
| 17 | 2.2490 | 0.0942 | | |
| 18 | 7.3146 | 0.2033 | 1.78590 | 44.20 |
| 19 | −3.7179 | 0.1197 | | |
| 20 | −1.5994 | 0.0919 | 1.75520 | 27.51 |
| 21 | 2.6759 | 0.3890 | 1.61800 | 63.33 |
| 22 | −2.2984 | 0.0208 | | |
| 23 | 4.7000 | 0.3015 | 1.49700 | 81.54 |
| 24 | −6.1610 | 0.2387 | | |
| 25 | −17.3546 | 0.2049 | 1.80518 | 25.42 |
| 26 | −5.0225 | DD[26] | | |
| 27 | 9.5064 | 0.3156 | 1.71300 | 53.87 |
| 28 | −4.5489 | 0.8654 | | |
| 29 | ∞ | 1.5059 | 1.51633 | 64.14 |
| 30 | ∞ | | | |

TABLE 2

EXAMPLE 1 SPECIFICATION AND VARIABLE SURFACE DISTANCE

| | WIDE ANGLE END | MIDDLE | TELEPHOTO END |
|---|---|---|---|
| ZOOM RATIO | 1.000 | 1.229 | 1.510 |
| f | 1.000 | 1.229 | 1.510 |
| FNo. | 1.60 | 1.61 | 1.72 |
| 2ω[°] | 70.7 | 59.6 | 50.0 |
| DD[6] | 2.3499 | 1.8043 | 1.3310 |
| DD[10] | 0.8163 | 1.4859 | 1.3842 |

TABLE 2-continued

EXAMPLE 1 SPECIFICATION AND VARIABLE SURFACE DISTANCE

|  | WIDE ANGLE END | MIDDLE | TELEPHOTO END |
|---|---|---|---|
| DD[13] | 0.5718 | 1.1107 | 1.7986 |
| DD[15] | 1.5311 | 0.6519 | 0.1530 |
| DD[26] | 0.0736 | 0.2899 | 0.6759 |

TABLE 3

EXAMPLE 1 ASPHERICAL SURFACE COEFFICIENT

|  | SURFACE NUMBER | |
|---|---|---|
|  | 1 | 2 |
| K | 8.68766E+01 | −4.64908E+00 |
| A3 | 0.00000E+00 | 0.00000E+00 |
| A4 | 1.19164E−02 | 3.50742E−03 |
| A5 | −1.49525E−03 | 2.30167E−04 |
| A6 | −1.82533E−05 | −4.43147E−04 |
| A7 | −4.12637E−04 | −4.91266E−04 |
| A8 | 3.53057E−05 | 7.49210E−05 |
| A9 | −7.27553E−06 | −1.83759E−05 |
| A10 | 1.96616E−06 | −3.89986E−06 |
| A11 | −2.24256E−06 | 9.25767E−07 |
| A12 | 1.78086E−06 | 3.43131E−07 |
| A13 | −2.38858E−07 | −2.71708E−07 |
| A14 | −1.60083E−07 | 1.50625E−07 |
| A15 | −4.12755E−08 | −4.61108E−08 |

Figure 6:
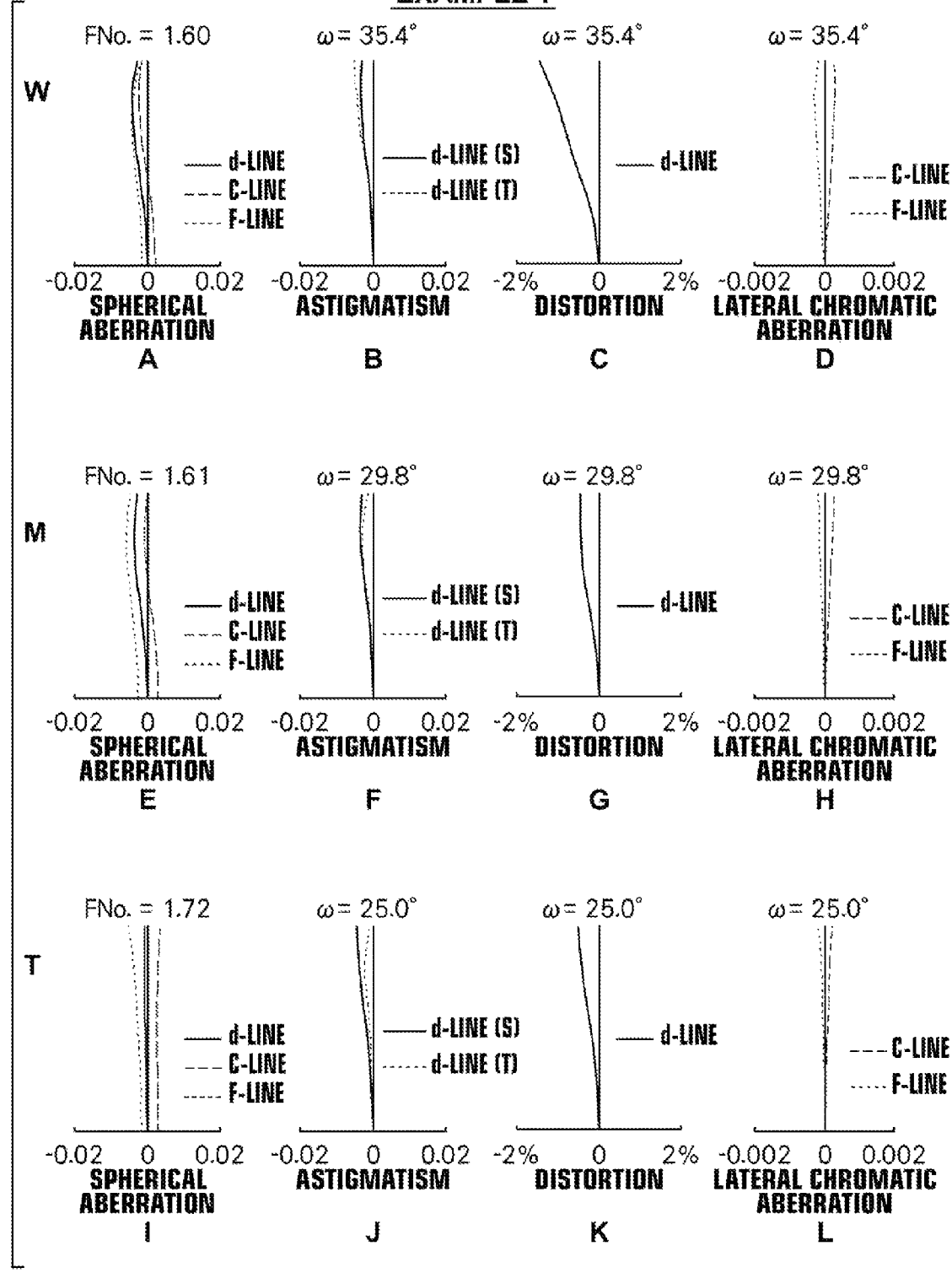
FIG. 6, Sections A through L are aberration diagrams of the zoom lens for projection in Example 1 of the present invention.

FIG. 6, Sections A through D illustrate aberration diagrams of a spherical aberration, astigmatism, distortion, and a lateral chromatic aberration of the zoom lens of projection in Example 1 at a wide angle end, respectively. FIG. 6, Sections E through H illustrate aberration diagrams of a spherical aberration, astigmatism, distortion, and a lateral chromatic aberration of the zoom lens of projection in Example 1 in a middle focal length state, respectively. FIG. 6, Sections I through L illustrate aberration diagrams of a spherical aberration, astigmatism, distortion, and a lateral chromatic aberration of the zoom lens of projection in Example 1 at a telephoto end, respectively.

Each of the aberration diagrams in FIG. 6, Sections A through L is based on d-line. The diagrams of the spherical aberration illustrate aberrations also for F-line (wavelength is 486.1 nm) and C-line (wavelength is 656.3 nm). The diagrams of the lateral chromatic aberration illustrate aberrations for F-line and C-line. In the diagrams of the astigmatism, aberrations for the sagittal direction are indicated by solid lines, and aberrations for the tangential direction are indicated by broken lines. The signs of (S) and (T) are written to explain the line types. In the diagrams of the spherical aberration, the sign "FNo" on the top of the vertical axis represents an F-number. In the other aberration diagrams, the sign of "ω" on the top of the vertical axis means a half angle of view. The aberration diagrams of FIG. 6, Sections A through L illustrate aberrations when a reduction ratio is −0.00625 times.

The signs, meanings and description methods of various data, the feature that values are normalized in such a manner that the focal length of the entire system at a wide angle end is 1, and the feature that the diagram of lens structure and the numerical values in the lens data represent those when a projection distance is infinity, and the feature that the aberration diagrams illustrate aberrations when a reduction ratio is −0.00625 times, which have been described in the explanation of Example 1, are similar also in the following Examples 2 through 5, unless otherwise mentioned specifically.

EXAMPLE 2

Figure 2:
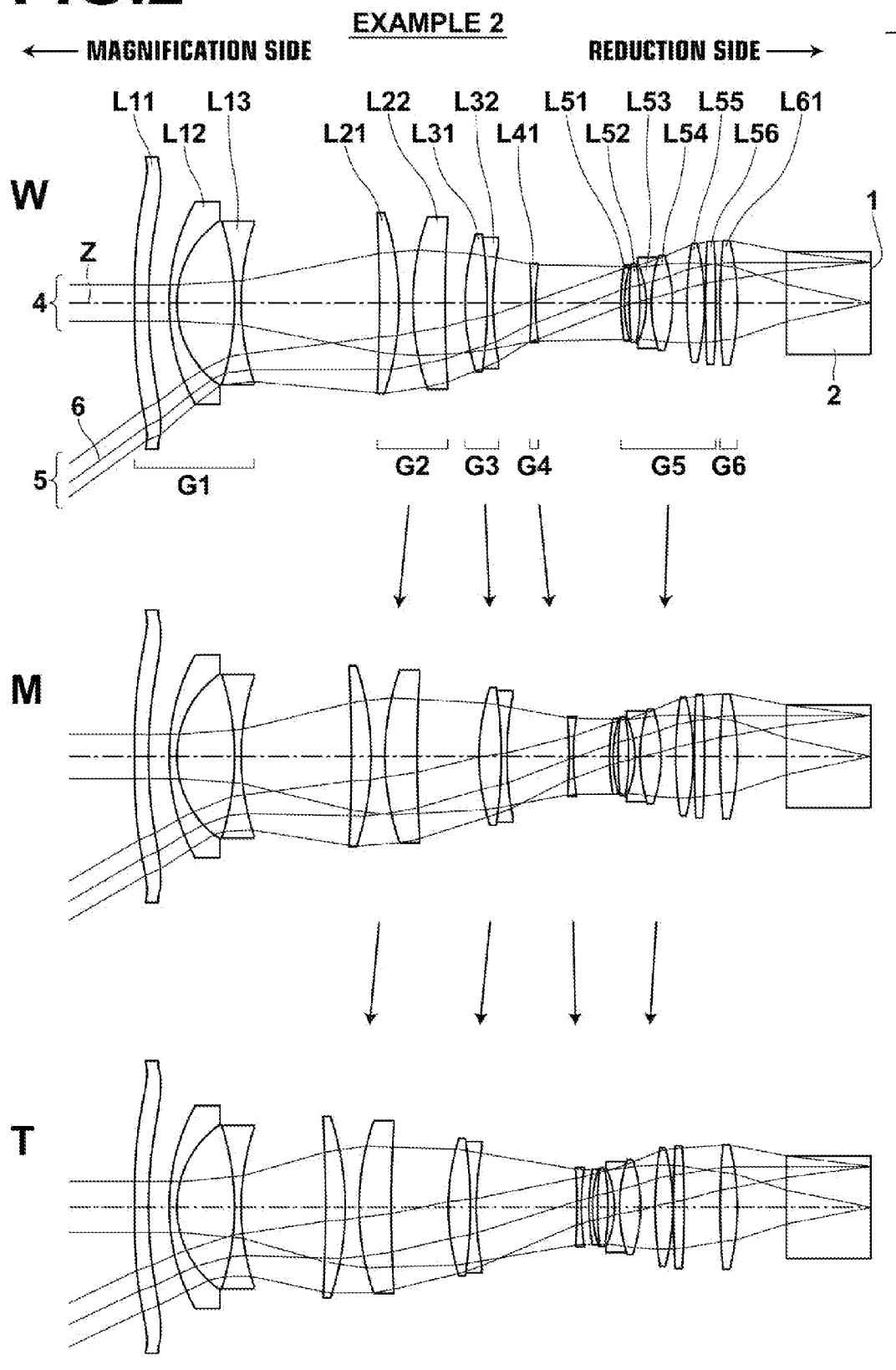
FIG. 2 is a cross section illustrating the lens structure of a zoom lens for projection in Example 2 of the present invention and paths of rays.

FIG. 2 illustrates the lens structure of a zoom lens for projection in Example 2 and paths of rays. The zoom lens for projection in Example 2 has almost similar structure to the zoom lens for projection in Example 1. However, the zoom lens for projection in Example 2 differs in that lens L56 is a biconvex lens.

Figure 7:
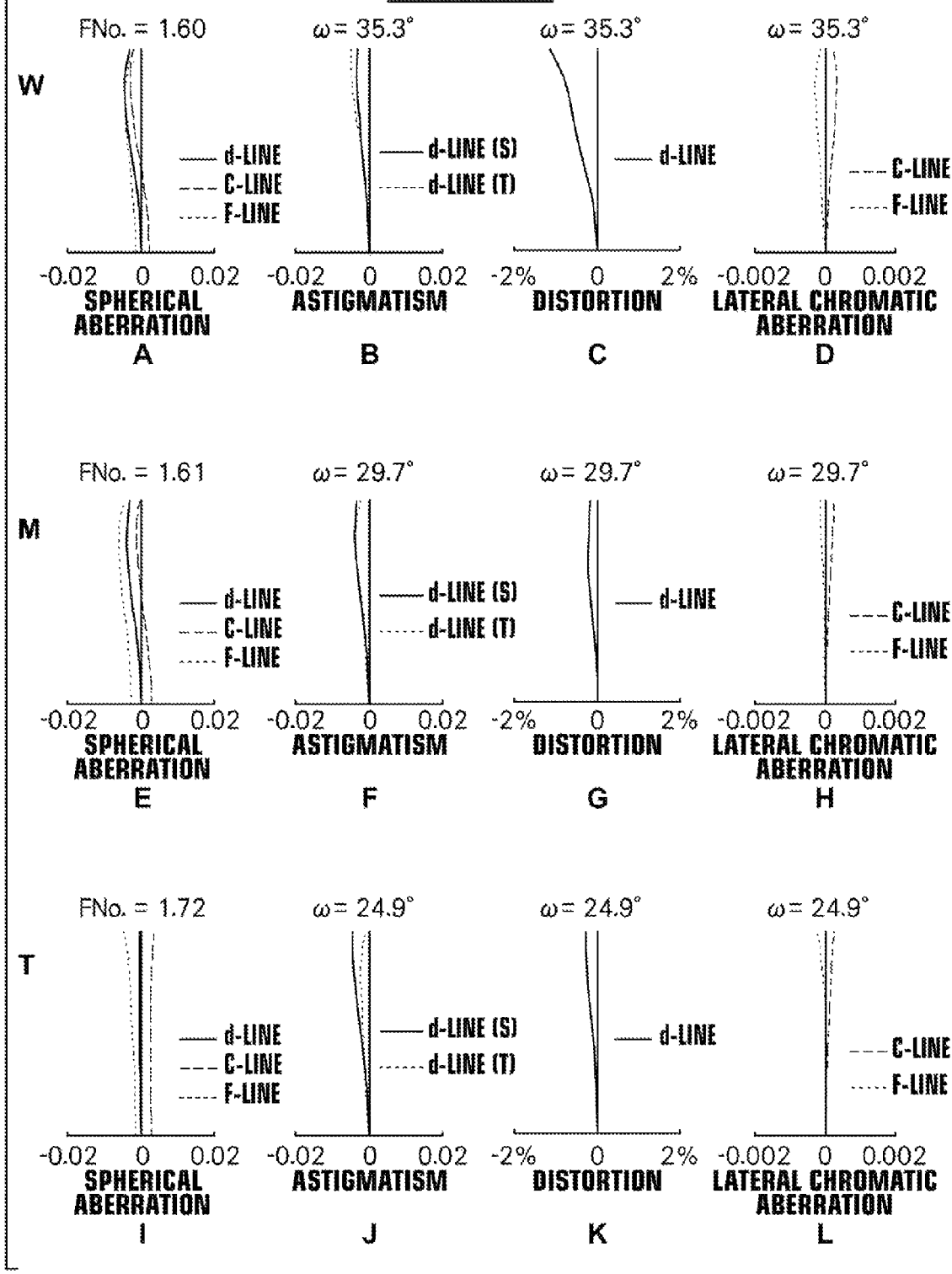
FIG. 7, Sections A through L are aberration diagrams of the zoom lens for projection in Example 2 of the present invention.

Table 4, Table 5 and Table 6 show basic lens data, specification for d-line and variable surface distances, and aspherical surface coefficients, respectively, for the zoom lens for projection in Example 2. FIG. 7, Sections A through L illustrate aberration diagrams of the zoom lens for projection in Example 2.

TABLE 4

EXAMPLE 2 BASIC LENS DATA

| Si | Ri | Di | Ndj | νdj |
|---|---|---|---|---|
| *1 | 24.7293 | 0.2492 | 1.49100 | 57.58 |
| *2 | 8.0491 | 0.3683 |  |  |
| 3 | 3.5056 | 0.1402 | 1.49700 | 81.54 |
| 4 | 1.7014 | 1.0231 |  |  |
| 5 | −4.4204 | 0.1194 | 1.71736 | 29.52 |
| 6 | 4.1701 | DD[6] |  |  |
| 7 | −28.5460 | 0.3488 | 1.78590 | 44.20 |
| 8 | −4.8043 | 0.2458 |  |  |
| 9 | 4.3319 | 0.5710 | 1.80400 | 46.57 |
| 10 | 20.6393 | DD[10] |  |  |
| 11 | 3.7903 | 0.3926 | 1.77250 | 49.60 |
| 12 | −7.7941 | 0.1038 | 1.56384 | 60.67 |
| 13 | 5.1239 | DD[13] |  |  |
| 14 | −9.1527 | 0.0778 | 1.71300 | 53.87 |
| 15 | 4.2137 | DD[15] |  |  |
| 16 | 3.6919 | 0.0609 | 1.80518 | 25.42 |
| 17 | 2.1901 | 0.0886 |  |  |
| 18 | 6.0538 | 0.1876 | 1.78590 | 44.20 |
| 19 | −3.7301 | 0.1123 |  |  |
| 20 | −1.6280 | 0.0919 | 1.75520 | 27.51 |
| 21 | 2.6041 | 0.3733 | 1.61800 | 63.33 |
| 22 | −2.4241 | 0.2591 |  |  |
| 23 | 6.2392 | 0.3115 | 1.49700 | 81.54 |
| 24 | −4.0311 | 0.0155 |  |  |
| 25 | 20.4030 | 0.1842 | 1.80518 | 25.42 |
| 26 | −16.9989 | DD[26] |  |  |
| 27 | 11.0876 | 0.3075 | 1.71300 | 53.87 |
| 28 | −4.3545 | 0.8666 |  |  |
| 29 | ∞ | 1.5054 | 1.51633 | 64.14 |
| 30 | ∞ |  |  |  |

TABLE 5

EXAMPLE 2 SPECIFICATION AND VARIABLE SURFACE DISTANCE

|  | WIDE ANGLE END | MIDDLE | TELEPHOTO END |
|---|---|---|---|
| ZOOM RATIO | 1.000 | 1.229 | 1.510 |
| f | 1.000 | 1.229 | 1.510 |
| FNo. | 1.60 | 1.61 | 1.72 |
| 2ω[°] | 70.5 | 59.4 | 49.9 |
| DD[6] | 2.4528 | 1.9574 | 1.4974 |
| DD[10] | 0.3561 | 1.1016 | 1.0135 |
| DD[13] | 0.6810 | 1.1034 | 1.7930 |
| DD[15] | 1.5162 | 0.6437 | 0.1372 |
| DD[26] | 0.0755 | 0.2755 | 0.6405 |

TABLE 6

EXAMPLE 2 ASPHERICAL SURFACE COEFFICIENT

| | SURFACE NUMBER | |
|---|---|---|
| | 1 | 2 |
| K | 7.95057E+01 | −3.01301E−02 |
| A3 | 0.00000E+00 | 0.00000E+00 |
| A4 | 1.28830E−02 | 3.33760E−03 |
| A5 | −1.74738E−03 | 3.20858E−04 |
| A6 | −1.38027E−04 | −3.22425E−04 |
| A7 | −4.41232E−04 | −5.09826E−04 |
| A8 | 3.54506E−05 | −3.02024E−04 |
| A9 | −5.08269E−06 | 1.49182E−04 |
| A10 | 2.48110E−06 | −3.75330E−06 |
| A11 | −2.47203E−06 | −4.31846E−06 |
| A12 | 1.44590E−06 | 4.29205E−07 |
| A13 | −1.65578E−07 | −1.67813E−07 |
| A14 | −1.26581E−07 | 1.59429E−07 |
| A15 | −1.92618E−08 | −5.33404E−08 |

EXAMPLE 3

Figure 3:
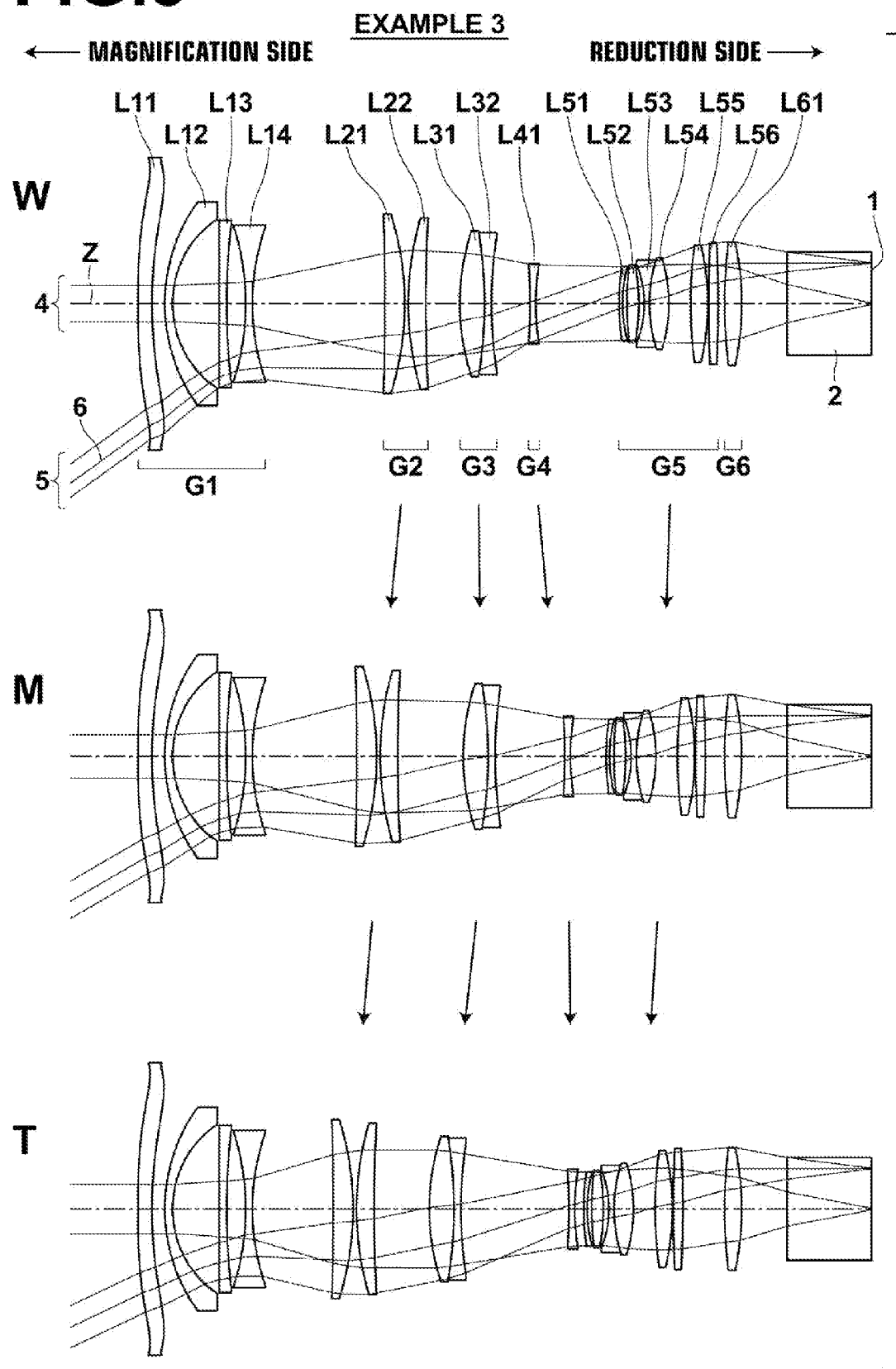
FIG. 3 is a cross section illustrating the lens structure of a zoom lens for projection in Example 3 of the present invention and paths of rays.

FIG. 3 illustrates the lens structure of a zoom lens for projection in Example 3 and paths of rays. The zoom lens for projection in Example 3 has almost similar structure to the zoom lens for projection in Example 1. However, the zoom lens for projection in Example 3 differs in that first lens group G1 consists of four lenses L11 through L14 arranged in this order from the magnification side, and that lens L13 is a plano-concave lens with its flat surface facing the magnification side, and that lens L14 is a biconcave lens, and that lens L56 is a biconvex lens.

Figure 8:
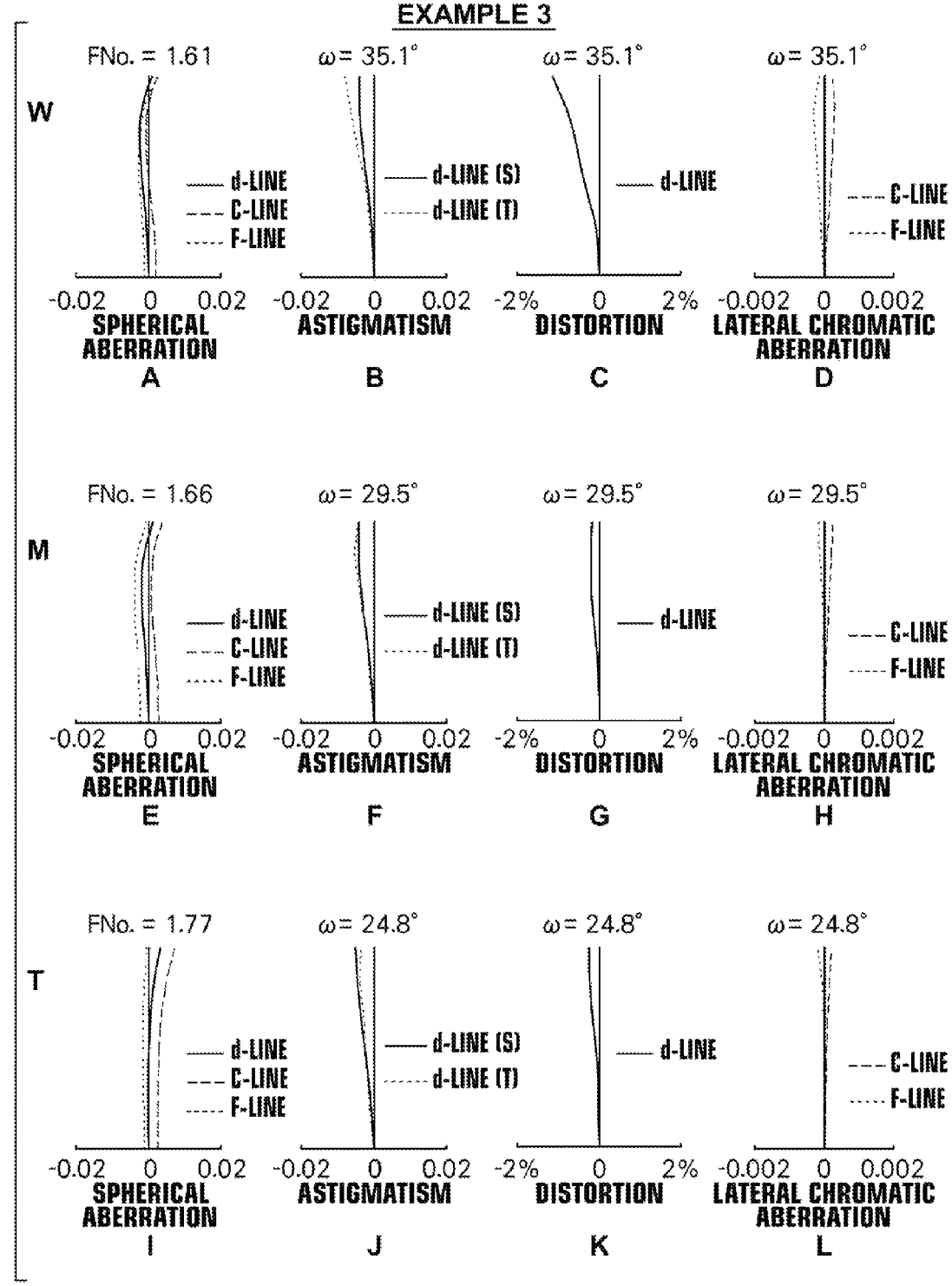
FIG. 8, Sections A through L are aberration diagrams of the zoom lens for projection in Example 3 of the present invention.

Table 7, Table 8 and Table 9 show basic lens data, specification for d-line and variable surface distances, and aspherical surface coefficients, respectively, for the zoom lens for projection in Example 3. FIG. 8, Sections A through L illustrate aberration diagrams of the zoom lens for projection in Example 3.

TABLE 7

EXAMPLE 3 BASIC LENS DATA

| Si | Ri | Di | Ndj | νdj |
|---|---|---|---|---|
| *1 | 25.7840 | 0.2476 | 1.49100 | 57.58 |
| *2 | 7.9900 | 0.2261 | | |
| 3 | 2.8950 | 0.1392 | 1.49700 | 81.54 |
| 4 | 1.7291 | 0.8282 | | |
| 5 | ∞ | 0.1289 | 1.58913 | 61.14 |
| 6 | 11.1718 | 0.3375 | | |
| 7 | −4.2294 | 0.1186 | 1.69895 | 30.13 |
| 8 | 3.8682 | DD[8] | | |
| 9 | −47.8392 | 0.3496 | 1.78590 | 44.20 |
| 10 | −4.9583 | 0.0625 | | |
| 11 | 5.0622 | 0.3100 | 1.80400 | 46.57 |
| 12 | 27.8030 | DD[12] | | |
| 13 | 3.8589 | 0.4383 | 1.77250 | 49.60 |
| 14 | −7.3021 | 0.1239 | 1.56384 | 60.67 |
| 15 | 7.3788 | DD[15] | | |
| 16 | −10.0913 | 0.1039 | 1.71300 | 53.87 |
| 17 | 4.0912 | DD[17] | | |
| 18 | 4.1957 | 0.0605 | 1.80518 | 25.42 |
| 19 | 2.3274 | 0.0804 | | |
| 20 | 5.9084 | 0.2063 | 1.78590 | 44.20 |
| 21 | −3.6379 | 0.0988 | | |
| 22 | −1.7201 | 0.0913 | 1.75520 | 27.51 |
| 23 | 2.4768 | 0.3439 | 1.61800 | 63.33 |
| 24 | −2.5252 | 0.3825 | | |
| 25 | 7.3269 | 0.3050 | 1.49700 | 81.54 |
| 26 | −4.1728 | 0.0155 | | |
| 27 | 20.1960 | 0.1676 | 1.80518 | 25.42 |
| 28 | −20.7146 | DD[28] | | |
| 29 | 7.9827 | 0.3056 | 1.71300 | 53.87 |
| 30 | −4.6811 | 0.7994 | | |
| 31 | ∞ | 1.4956 | 1.51633 | 64.14 |
| 32 | ∞ | | | |

TABLE 8

EXAMPLE 3 SPECIFICATION AND VARIABLE SURFACE DISTANCE

| | WIDE ANGLE END | MIDDLE | TELEPHOTO END |
|---|---|---|---|
| ZOOM RATIO | 1.000 | 1.229 | 1.510 |
| f′ | 1.000 | 1.229 | 1.510 |
| FNo. | 1.61 | 1.66 | 1.77 |
| 2ω[°] | 70.2 | 59.1 | 49.6 |
| DD[8] | 2.3432 | 1.8467 | 1.4302 |
| DD[12] | 0.6010 | 1.1599 | 0.9737 |
| DD[15] | 0.6821 | 1.2324 | 1.9112 |
| DD[17] | 1.4715 | 0.6289 | 0.1573 |
| DD[28] | 0.1132 | 0.3431 | 0.7385 |

TABLE 9

EXAMPLE 3 ASPHERICAL SURFACE COEFFICIENT

| | SURFACE NUMBER | |
|---|---|---|
| | 1 | 2 |
| K | 8.89885E+01 | 4.41313E−01 |
| A3 | 0.00000E+00 | 0.00000E+00 |
| A4 | 1.33243E−02 | 3.09175E−03 |
| A5 | −1.97178E−03 | 3.64395E−04 |
| A6 | −1.72635E−04 | −3.38774E−04 |
| A7 | −4.52789E−04 | −5.97589E−04 |
| A8 | 4.03943E−05 | −3.20819E−04 |
| A9 | −4.91652E−06 | 1.65023E−04 |
| A10 | 1.87561E−06 | −3.31414E−06 |
| A11 | −2.63632E−06 | −3.86767E−06 |
| A12 | 1.58183E−06 | 5.03858E−07 |
| A13 | −1.45694E−07 | −7.53136E−08 |
| A14 | −1.30284E−07 | 1.60581E−07 |
| A15 | −1.41964E−08 | −7.60970E−08 |

EXAMPLE 4

Figure 4:
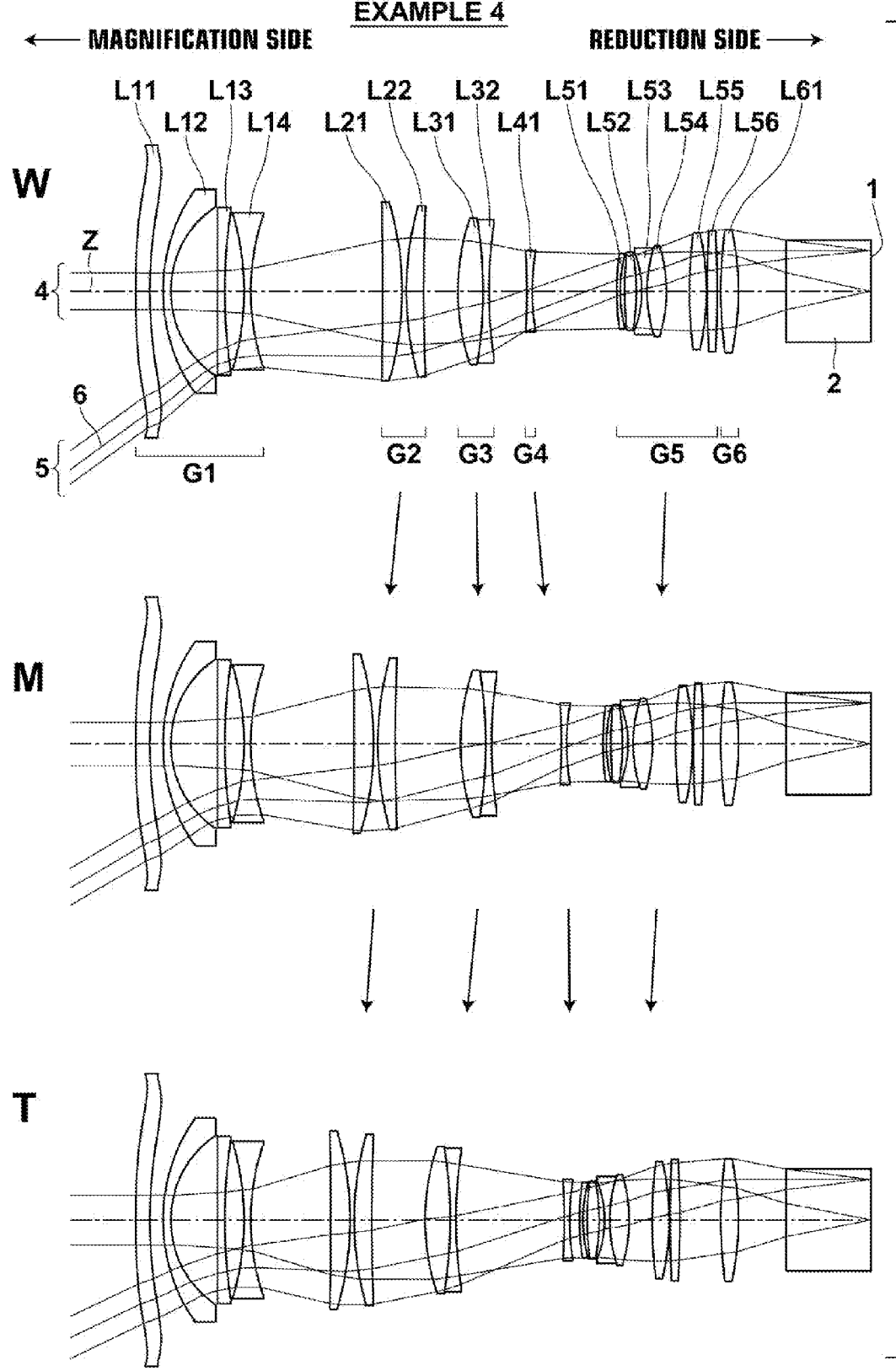
FIG. 4 is a cross section illustrating the lens structure of a zoom lens for projection in Example 4 of the present invention and paths of rays.

FIG. 4 illustrates the lens structure of a zoom lens for projection in Example 4 and paths of rays. The zoom lens for projection in Example 4 has almost similar structure to the zoom lens for projection in Example 3.

Figure 9:
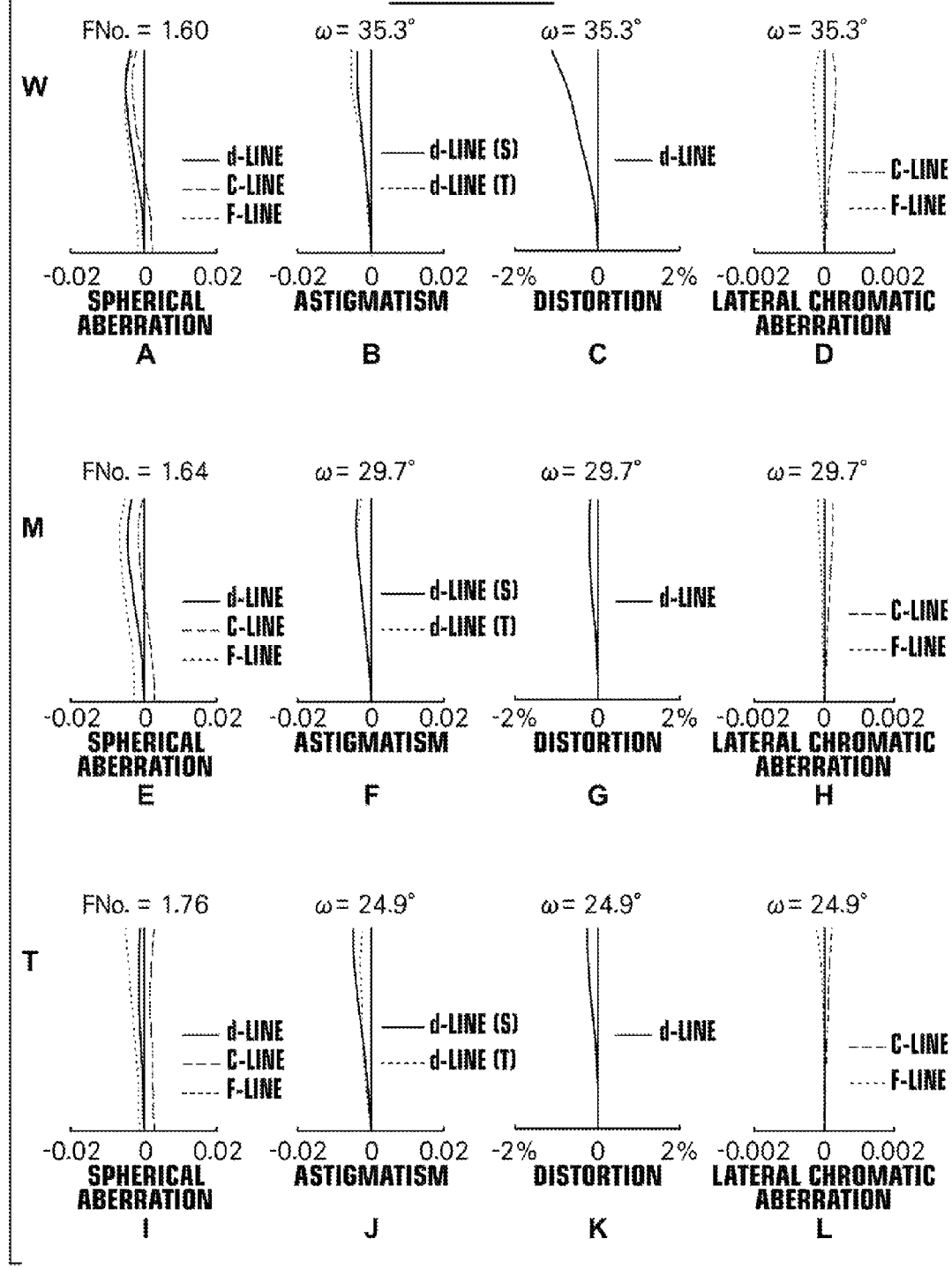
FIG. 9, Sections A through L are aberration diagrams of the zoom lens for projection in Example 4 of the present invention.

Table 10, Table 11 and Table 12 show basic lens data, specification for d-line and variable surface distances, and aspherical surface coefficients, respectively, for the zoom lens for projection in Example 4. FIG. 9, Sections A through L illustrate aberration diagrams of the zoom lens for projection in Example 4.

TABLE 10

EXAMPLE 4 BASIC LENS DATA

| Si | Ri | Di | Ndj | vdj |
|---|---|---|---|---|
| *1 | 24.3287 | 0.2492 | 1.49100 | 57.58 |
| *2 | 8.1491 | 0.2339 | | |
| 3 | 2.9592 | 0.1402 | 1.49700 | 81.54 |
| 4 | 1.7309 | 0.8297 | | |
| 5 | ∞ | 0.1298 | 1.58913 | 61.14 |
| 6 | 8.8492 | 0.3419 | | |
| 7 | −4.5678 | 0.1194 | 1.69895 | 30.13 |
| 8 | 3.9386 | DD[8] | | |
| 9 | −84.6941 | 0.3466 | 1.78590 | 44.20 |
| 10 | −5.2072 | 0.0748 | | |
| 11 | 5.2341 | 0.3090 | 1.80400 | 46.57 |
| 12 | 32.3020 | DD[12] | | |
| 13 | 3.8444 | 0.4456 | 1.77250 | 49.60 |
| 14 | −7.5476 | 0.1043 | 1.56384 | 60.67 |
| 15 | 7.5109 | DD[15] | | |
| 16 | −11.0474 | 0.0957 | 1.71300 | 53.87 |
| 17 | 4.0961 | DD[17] | | |
| 18 | 4.3900 | 0.0609 | 1.80518 | 25.42 |
| 19 | 2.4063 | 0.0792 | | |
| 20 | 5.8584 | 0.2076 | 1.78590 | 44.20 |
| 21 | −3.6972 | 0.0972 | | |
| 22 | −1.7814 | 0.0919 | 1.75520 | 27.51 |
| 23 | 2.3870 | 0.3433 | 1.61800 | 63.33 |
| 24 | −2.6657 | 0.4089 | | |
| 25 | 7.5621 | 0.3028 | 1.49700 | 81.54 |
| 26 | −4.3593 | 0.0155 | | |
| 27 | 20.9440 | 0.1736 | 1.80518 | 25.42 |
| 28 | −18.6908 | DD[28] | | |
| 29 | 7.4413 | 0.3118 | 1.71300 | 53.87 |
| 30 | −4.8936 | 0.8487 | | |
| 31 | ∞ | 1.5057 | 1.51633 | 64.14 |
| 32 | ∞ | | | |

TABLE 11

EXAMPLE 4 SPECIFICATION AND VARIABLE SURFACE DISTANCE

| | WIDE ANGLE END | MIDDLE | TELEPHOTO END |
|---|---|---|---|
| ZOOM RATIO | 1.000 | 1.229 | 1.510 |
| f | 1.000 | 1.229 | 1.510 |
| FNo. | 1.60 | 1.64 | 1.76 |
| 2ω[°] | 70.6 | 59.4 | 49.9 |
| DD[8] | 2.3404 | 1.8348 | 1.4169 |
| DD[12] | 0.6086 | 1.1607 | 0.9481 |
| DD[15] | 0.6779 | 1.2428 | 1.9232 |
| DD[17] | 1.4996 | 0.6424 | 0.1763 |
| DD[28] | 0.0662 | 0.3121 | 0.7282 |

TABLE 12

EXAMPLE 4 ASPHERICAL SURFACE COEFFICIENT

| | SURFACE NUMBER | |
|---|---|---|
| | 1 | 2 |
| K | 7.38661E+01 | −3.34758E−01 |
| A3 | 0.00000E+00 | 0.00000E+00 |
| A4 | 1.30502E−02 | 3.45078E−03 |
| A5 | −1.89938E−03 | 2.99205E−04 |
| A6 | −3.21270E−04 | −4.42507E−04 |
| A7 | −4.14660E−04 | −5.67211E−04 |
| A8 | 4.07749E−05 | −3.15817E−04 |
| A9 | −4.12321E−06 | 1.58873E−04 |
| A10 | 1.09323E−06 | −3.50910E−06 |
| A11 | −2.86680E−06 | −2.76271E−06 |
| A12 | 1.32671E−06 | 4.94952E−07 |
| A13 | −6.03375E−08 | −1.65721E−07 |
| A14 | −1.04471E−07 | 1.78761E−07 |
| A15 | −1.26103E−08 | −7.82885E−08 |

EXAMPLE 5

Figure 5:
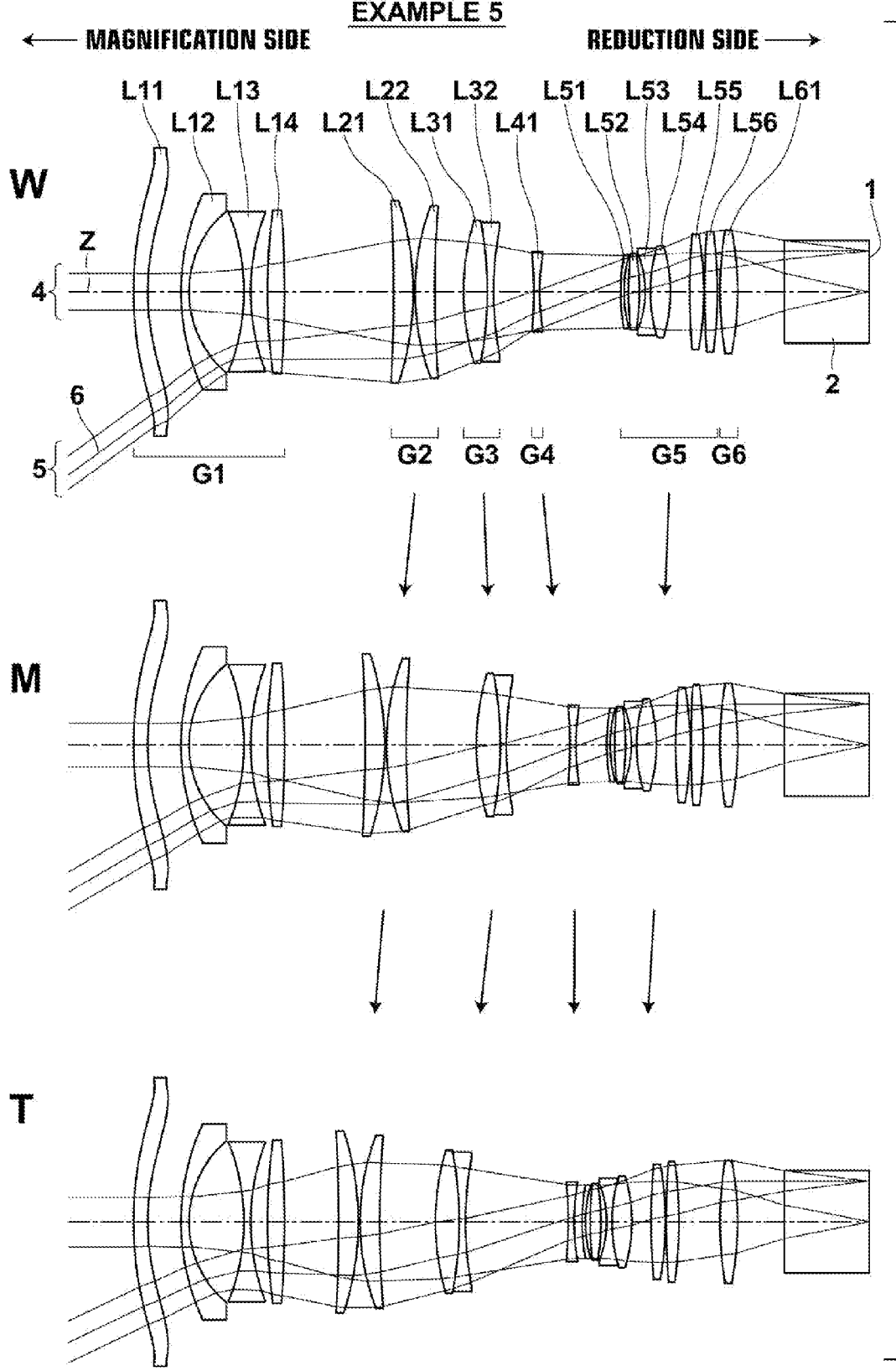
FIG. 5 is a cross section illustrating the lens structure of a zoom lens for projection in Example 5 of the present invention and paths of rays.

FIG. 5 illustrates the lens structure of a zoom lens for projection in Example 5 and paths of rays. The zoom lens for projection in Example 5 has almost similar structure to the zoom lens for projection in Example 3. However, the zoom lens for projection in Example 5 differs in that lens L13 is a biconcave lens, and that lens L14 is biconvex lens.

Figure 10:
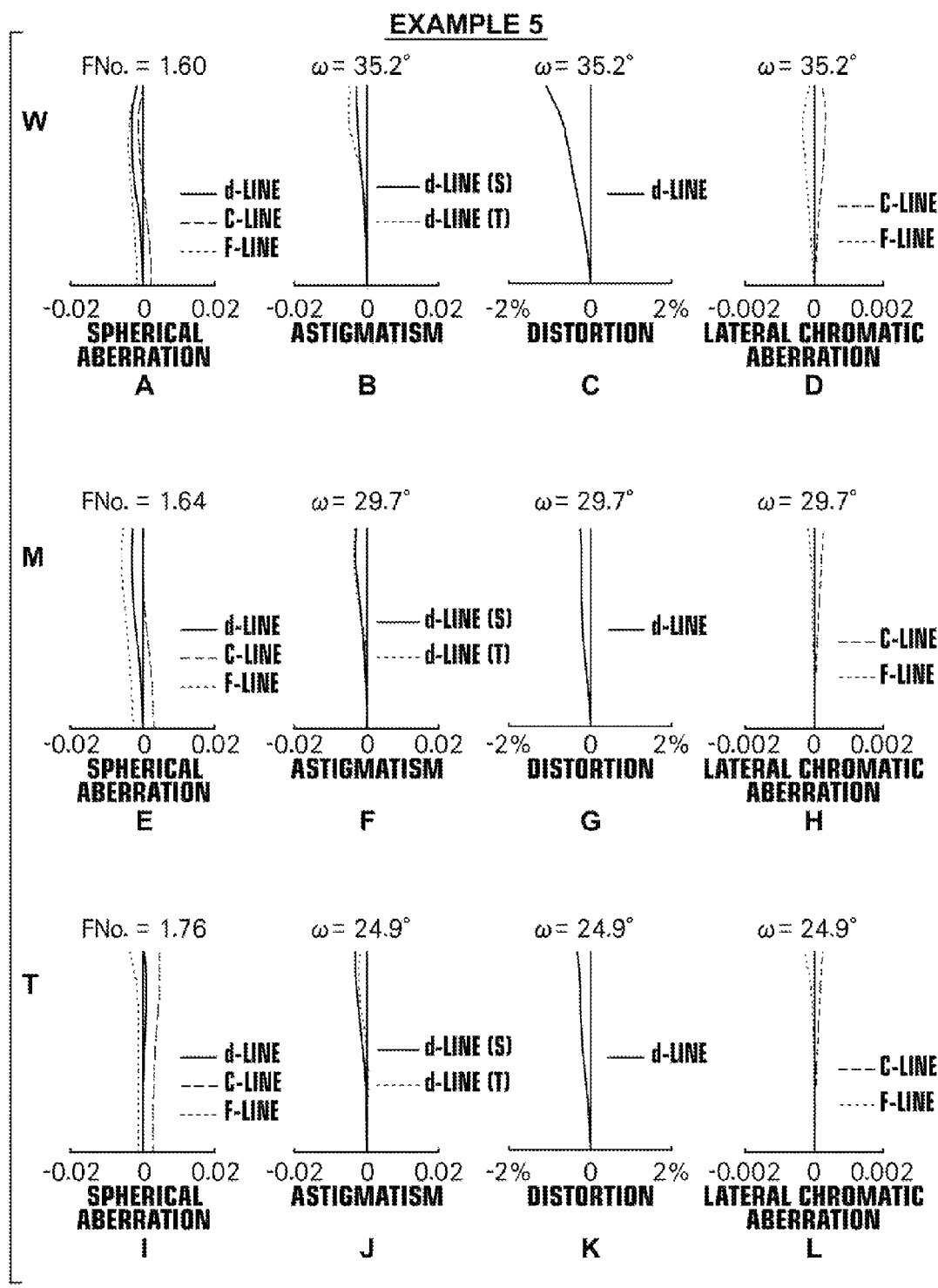
FIG. 10, Sections A through L are aberration diagrams of the zoom lens for projection in Example 5 of the present invention.

Table 13, Table 14 and Table 15 show basic lens data, specification for d-line and variable surface distances, and aspherical surface coefficients, respectively, for the zoom lens for projection in Example 5. FIG. 10, Sections A through L illustrate aberration diagrams of the zoom lens for projection in Example 5.

TABLE 13

EXAMPLE 5 BASIC LENS DATA

| Si | Ri | Di | Ndj | vdj |
|---|---|---|---|---|
| *1 | 6.3060 | 0.2491 | 1.49100 | 57.58 |
| *2 | 3.7513 | 0.5951 | | |
| 3 | 3.8621 | 0.1401 | 1.61800 | 63.33 |
| 4 | 1.7860 | 0.9724 | | |
| 5 | −3.5515 | 0.1193 | 1.72342 | 37.95 |
| 6 | 3.6996 | 0.2984 | | |
| 7 | 10.3538 | 0.3024 | 1.64769 | 33.79 |
| 8 | −17.0509 | DD[8] | | |
| 9 | −26.8254 | 0.3461 | 1.77250 | 49.60 |
| 10 | −4.8745 | 0.0326 | | |
| 11 | 4.0359 | 0.3490 | 1.77250 | 49.60 |
| 12 | 18.2417 | DD[12] | | |
| 13 | 4.1521 | 0.4219 | 1.78590 | 44.20 |
| 14 | −6.2349 | 0.1099 | 1.60342 | 38.03 |
| 15 | 5.6822 | DD[15] | | |
| 16 | −7.4562 | 0.1050 | 1.58913 | 61.14 |
| 17 | 3.7502 | DD[17] | | |
| 18 | 3.4233 | 0.0609 | 1.80518 | 25.42 |
| 19 | 2.2745 | 0.0811 | | |
| 20 | 6.0032 | 0.1887 | 1.77250 | 49.60 |
| 21 | −4.1304 | 0.1058 | | |
| 22 | −1.7030 | 0.0919 | 1.75520 | 27.51 |
| 23 | 2.5889 | 0.3518 | 1.61800 | 63.33 |
| 24 | −2.6620 | 0.3422 | | |
| 25 | 10.9709 | 0.2520 | 1.49700 | 81.54 |
| 26 | −5.4696 | 0.0155 | | |
| 27 | 14.6659 | 0.2229 | 1.69895 | 30.13 |
| 28 | −7.5116 | DD[28] | | |
| 29 | 6.3763 | 0.3097 | 1.71300 | 53.87 |
| 30 | −5.2234 | 0.8277 | | |
| 31 | ∞ | 1.5047 | 1.51633 | 64.14 |
| 32 | ∞ | | | |

TABLE 14

EXAMPLE 5 SPECIFICATION AND VARIABLE SURFACE DISTANCE

| | WIDE ANGLE END | MIDDLE | TELEPHOTO END |
|---|---|---|---|
| ZOOM RATIO | 1.000 | 1.229 | 1.510 |
| f | 1.000 | 1.229 | 1.510 |
| FNo. | 1.60 | 1.64 | 1.76 |

TABLE 14-continued

EXAMPLE 5 SPECIFICATION AND VARIABLE
SURFACE DISTANCE

|  | WIDE ANGLE END | MIDDLE | TELEPHOTO END |
|---|---|---|---|
| 2ω[°] | 70.5 | 59.4 | 49.9 |
| DD[8] | 1.9305 | 1.4247 | 0.9575 |
| DD[12] | 0.5097 | 1.2440 | 0.9847 |
| DD[15] | 0.7146 | 1.1262 | 1.8218 |
| DD[17] | 1.4314 | 0.5471 | 0.1420 |
| DD[28] | 0.0497 | 0.2939 | 0.7298 |

TABLE 15

EXAMPLE 5 ASPHERICAL SURFACE COEFFICIENT

| | SURFACE NUMBER | |
|---|---|---|
| | 1 | 2 |
| K | −4.44291E+00 | −1.79882E+00 |
| A3 | 0.00000E+00 | 0.00000E+00 |
| A4 | 5.88157E−03 | 1.23460E−04 |
| A5 | 3.68904E−04 | −1.32558E−03 |
| A6 | −8.38742E−04 | −9.18466E−04 |
| A7 | −1.95828E−04 | −2.92573E−04 |
| A8 | 3.92245E−05 | 1.37372E−05 |
| A9 | 1.13939E−05 | 1.95271E−05 |
| A10 | −1.41814E−06 | 2.09915E−06 |
| A11 | −1.82288E−06 | 9.99610E−07 |
| A12 | −8.56606E−07 | −5.62218E−07 |
| A13 | −1.80468E−07 | −5.59049E−06 |
| A14 | 2.13628E−08 | 7.38582E−09 |
| A15 | 3.71653E−09 | −1.16527E−08 |

Table 16 shows values corresponding to conditional formulas (1) through (15) in Examples 1 through 5. Further, Table 17 shows various values in Examples 1 through 5. In Table 17, f1 represents the focal length of first lens group G1, f2 represents the focal length of second lens group G1, f6 represents the focal length of sixth lens group G6, and ft represents the focal length of the entire system at the telephoto end.

TABLE 16

| CONDITIONAL FORMULA | | EXAMPLE 1 | EXAMPLE 2 | EXAMPLE 3 | EXAMPLE 4 | EXAMPLE 5 |
|---|---|---|---|---|---|---|
| (1) | (R51a + R51b)/(R51a − R51b) | 3.451 | 3.917 | 3.491 | 3.426 | 4.960 |
| (2) | ν d51 | 25.42 | 25.42 | 25.42 | 25.42 | 25.42 |
| (3) | Nd52 | 1.78590 | 1.78590 | 1.78590 | 1.78590 | 1.77250 |
| (4) | ν d52 | 44.20 | 44.20 | 44.20 | 44.20 | 49.60 |
| (5) | R51b/R52a | 0.307 | 0.362 | 0.394 | 0.411 | 0.379 |
| (6) | (|fF56w| − dG45w)/fw | −0.777 | −0.789 | −0.805 | −0.819 | −0.759 |
| (7) | (|fF56t| − dG45t)/fw | 0.456 | 0.463 | 0.347 | 0.329 | 0.351 |
| (8) | f4/fw | −4.182 | −4.037 | −4.070 | −4.180 | −4.221 |
| (9) | f3/fw | 6.397 | 7.938 | 6.406 | 6.367 | 8.520 |
| (10) | f5/fw | 3.852 | 3.709 | 3.957 | 4.064 | 3.980 |
| (11) | Fnw | 1.60 | 1.60 | 1.61 | 1.60 | 1.60 |
| (12) | 2ωw | 70.7 | 70.5 | 70.2 | 70.6 | 70.5 |
| (13) | Zr | 1.510 | 1.510 | 1.510 | 1.510 | 1.510 |
| (14) | Bf/Im φ | 1.326 | 1.327 | 1.308 | 1.314 | 1.299 |
| (15) | Bf/fw | 1.859 | 1.859 | 1.821 | 1.842 | 1.820 |

TABLE 17

| | EXAMPLE 1 | EXAMPLE 2 | EXAMPLE 3 | EXAMPLE 4 | EXAMPLE 5 |
|---|---|---|---|---|---|
| R51a | 4.0839 | 3.6919 | 4.1957 | 4.3900 | 3.4233 |
| R51b | 2.2490 | 2.1901 | 2.3274 | 2.4063 | 2.2745 |

TABLE 17-continued

| | EXAMPLE 1 | EXAMPLE 2 | EXAMPLE 3 | EXAMPLE 4 | EXAMPLE 5 |
|---|---|---|---|---|---|
| R52a | 7.3146 | 6.0538 | 5.9084 | 5.8584 | 6.0032 |
| fF56w | −0.754 | −0.728 | −0.667 | −0.680 | −0.673 |
| fF56t | −0.609 | −0.600 | −0.504 | −0.505 | −0.493 |
| dG45w | 1.5311 | 1.5162 | 1.4715 | 1.4996 | 1.4314 |
| dG45t | 0.1530 | 0.1372 | 0.1573 | 0.1763 | 0.1420 |
| f1 | −1.700 | −1.681 | −1.567 | −1.565 | −1.713 |
| f2 | 3.837 | 3.529 | 3.660 | 3.693 | 3.540 |
| f3 | 6.397 | 7.938 | 6.406 | 6.367 | 8.520 |
| f4 | −4.182 | −4.037 | −4.070 | −4.180 | −4.221 |
| f5 | 3.852 | 3.709 | 3.957 | 4.064 | 3.980 |
| f6 | 4.356 | 4.422 | 4.181 | 4.185 | 4.072 |
| fw | 1.000 | 1.000 | 1.000 | 1.000 | 1.000 |
| ft | 1.510 | 1.510 | 1.510 | 1.510 | 1.510 |
| Bf | 1.859 | 1.859 | 1.821 | 1.842 | 1.820 |
| Imφ | 1.4021 | 1.4016 | 1.3925 | 1.4018 | 1.4010 |

So far, the present invention has been described by using embodiments and examples. However, the zoom lens for projection of the present invention is not limited to the aforementioned examples, and various modifications of the mode are possible. For example, the curvature radius of each lens, a distance between surfaces, a refractive index, and an Abbe number may be appropriately modified.

Further, the configuration of the projection-type display apparatus of the present invention is not limited to the aforementioned configurations. For example, light valves to be used and optical members to be used to separate rays or combine rays are not limited to the aforementioned configurations, and various modifications of the mode are possible.

What is claimed is:

1. A zoom lens for projection substantially consisting of six lens groups of:
   a first lens group having negative refractive power;
   a second lens group having positive refractive power;
   a third lens group having positive refractive power;
   a fourth lens group having negative refractive power;
   a fifth lens group having positive refractive power; and
   a sixth lens group having positive refractive power in this order from a magnification side,
   wherein the zoom lens is configured in such a manner that the first lens group and the sixth lens group are fixed and the second through fifth lens groups move during magnification change,
   wherein a reduction side is telecentric, wherein first through fourth lenses from the magnification side in the fifth lens group are a negative meniscus-shaped single lens with its convex surface facing the magnification side, a positive single lens, a biconcave lens and a biconvex lens, respectively, and the biconcave lens and the biconvex lens are cemented together, and wherein each single lens consists of one lens which is not cemented.

2. The zoom lens for projection, as defined in claim 1, wherein the following conditional formula (1) is satisfied:

$$2.5<(R51a+R51b)/(R51a-R51b)<7.0 \quad (1),$$

where

R51a: a curvature radius of a magnification-side surface of a most-magnification-side lens in the fifth lens group, and R51b: a curvature radius of a reduction-side surface of the most-magnification-side lens in the fifth lens group.

3. The zoom lens for projection, as defined in claim 1, wherein the following conditional formulas (2) through (4) are satisfied:

$$vd51<35.0 \quad (2);$$

$$1.72<Nd52 \quad (3);$$

and $$vd52<60.0 \quad (4),$$

where vd51: an Abbe number of the most-magnification-side lens in the fifth lens group for d-line, Nd52: a refractive index of the second lens from the magnification side in the fifth lens group for d-line, and vd52: an Abbe number of the second lens from the magnification side in the fifth lens group for d-line.

4. The zoom lens for projection, as defined in claim 1, wherein the following conditional formula (5) is satisfied:

$$0.10<R51b/R52a<0.70 \quad (5),$$

where

R51b: a curvature radius of a reduction-side surface of the most-magnification-side lens in the fifth lens group, and R52a: a curvature radius of a magnification-side surface of the second lens from the magnification side in the fifth lens group.

5. The zoom lens for projection, as defined in claim 1, wherein the zoom lens is configured in such a manner that the fourth lens group moves toward a reduction side when magnification is changed from a wide angle end to a telephoto end.

6. The zoom lens for projection, as defined in claim 1, wherein the following conditional formulas (6) and (7) are satisfied:

$$(|fF56w|-dG45w)/fw<0.0 \quad (6);$$

and $$0.0<(|fF56t|-dG45t)/fw \quad (7),$$

where fw: a focal length of an entire system at a wide angle end,
fF56w: a combined front focus of the fifth lens group and the sixth lens group at the wide angle end,
fF56t: a combined front focus of the fifth lens group and the sixth lens group at a telephoto end, dG45w: a distance on an optical axis between the fourth lens group and the fifth lens group at the wide angle end, and dG45t: a distance on the optical axis between the fourth lens group and the fifth lens group at the telephoto end.

7. The zoom lens for projection, as defined in claim 1, wherein the zoom lens is configured in such a manner that the second lens group and the fifth lens group move toward the magnification side when magnification is changed from a wide angle end to a telephoto end.

8. The zoom lens for projection, as defined in claim 1, wherein the fourth lens group substantially consists of a negative lens.

9. The zoom lens for projection, as defined in claim 1, wherein the following conditional formula (8) is satisfied:

$$-6.0<f4/fw<-2.0 \quad (8),$$

where f4: a focal length of the fourth lens group, and
fw: a focal length of an entire system at a wide angle end.

10. The zoom lens for projection, as defined in claim 1, wherein a most-magnification-side lens in the first lens group has at least one aspherical surface.

11. The zoom lens for projection, as defined in claim 1, wherein the third lens group substantially consists of a cemented lens composed of a positive lens and a negative lens cemented together in this order from the magnification side.

12. The zoom lens for projection, as defined in claim 1, wherein the following conditional formula (9) is satisfied:

$$4.0<f3/fw<12.0 \quad (9),$$

where f3: a focal length of the third lens group, and
fw: a focal length of an entire system at a wide angle end.

13. The zoom lens for projection, as defined in claim 1, wherein the following conditional formula (10) is satisfied:

$$2.0<f5/fw<6.0 \quad (10),$$

where f5: a focal length of the fifth lens group, and
fw: a focal length of an entire system at a wide angle end.

14. The zoom lens for projection, as defined in claim 1, wherein the following conditional formula (11) is satisfied:

$$Fnw \leq 1.8 \quad (11),$$

where

Fnw: an F-number at a wide angle end.

15. The zoom lens for projection, as defined in claim 1, wherein the following conditional formula (12) is satisfied:

$$60° \leq 2\omega w \quad (12),$$

where

2ωw: a maximum full angle of view at a wide angle end.

16. The zoom lens for projection, as defined in claim 1, wherein the following conditional formula (13) is satisfied:

$$1.4 \leq Zr \quad (13),$$

where

Zr: a zoom ratio.

17. The zoom lens for projection, as defined in claim 1, wherein the following conditional formula (1') is satisfied:

$$3.0<(R51a+R51b)/(R51a-R51b)<5.5 \quad (1'),$$

where

R51a: a curvature radius of a magnification-side surface of a most-magnification-side lens in the fifth lens group, and R51b: a curvature radius of a reduction-side surface of the most-magnification-side lens in the fifth lens group.

18. The zoom lens for projection, as defined in claim 1, wherein the following conditional formulas (2') through (4') are satisfied:

$$23.0 < vd51 < 30.0 \quad (2');$$

$$1.75 < Nd52 < 1.80 \quad (3');$$

and $$35.0 < vd52 < 55.0 \quad (4'),$$

where vd51: an Abbe number of the most-magnification-side lens in the fifth lens group for d-line, Nd52: a refractive index of the second lens from the magnification side in the fifth lens group for d-line, and vd52: an Abbe number of the second lens from the magnification side in the fifth lens group for d-line.

19. The zoom lens for projection, as defined in claim 1, wherein the following conditional formula (5') is satisfied:

$$0.25 < R51b/R52a < 0.50 \quad (5'),$$

where

R51b: a curvature radius of a reduction-side surface of the most-magnification-side lens in the fifth lens group, and R52a: a curvature radius of a magnification-side surface of the second lens from the magnification side in the fifth lens group.

20. A projection-type display apparatus comprising:

a light source;

a light valve on which light from the light source is incident; and the zoom lens for projection, as defined in claim 1, as a zoom lens for projection that projects an optical image of light that has been optically modulated by the light valve onto a screen.

* * * * *